US011464074B2

(12) United States Patent
Di Girolamo et al.

(10) Patent No.: US 11,464,074 B2
(45) Date of Patent: Oct. 4, 2022

(54) NETWORK SERVICE EXPOSURE FOR SERVICE AND SESSION CONTINUITY

(71) Applicant: IPLA HOLDINGS INC., New York, NY (US)

(72) Inventors: Rocco Di Girolamo, Laval (CA); Michael F. Starsinic, Newtown, PA (US); Catalina Mihaela Mladin, Hatboro, PA (US); Hongkun Li, Malvern, PA (US)

(73) Assignee: IPLA HOLDINGS INC., New York, NY (US)

( * ) Notice: Subject to any disclaimer, the term of this patent is extended or adjusted under 35 U.S.C. 154(b) by 39 days.

(21) Appl. No.: 17/083,501

(22) Filed: Oct. 29, 2020

(65) Prior Publication Data

US 2021/0076455 A1  Mar. 11, 2021

Related U.S. Application Data

(63) Continuation of application No. 16/325,224, filed as application No. PCT/US2017/047556 on Aug. 18, 2017, now Pat. No. 10,849,189.

(Continued)

(51) Int. Cl.
*H04W 36/00* (2009.01)
*H04W 88/00* (2009.01)
(Continued)

(52) U.S. Cl.
CPC ....... *H04W 88/005* (2013.01); *H04L 63/0892* (2013.01); *H04L 67/148* (2013.01);
(Continued)

(58) Field of Classification Search
CPC ..... H04W 88/005; H04W 88/16; H04W 8/26; H04W 36/0011; H04W 36/0033; H04W 80/10; H04L 63/0892; H04L 67/148
See application file for complete search history.

(56) References Cited

U.S. PATENT DOCUMENTS 10,667,179 B1    5/2020  Young et al.
2017/0251329 A1  8/2017  Bhalla
(Continued)

FOREIGN PATENT DOCUMENTS

CN    1889560 A     1/2007
CN  101163260 A     4/2008
(Continued)

OTHER PUBLICATIONS

Intel, S2-163186, "Update of Solution 6.1," SA WG2 Temporary Document, SA WG2 Meeting #115, May 23-27, 2016, Nanjing, P.R. China, pp. 1-9.
(Continued)

*Primary Examiner* — Melvin C Marcelo
(74) *Attorney, Agent, or Firm* — Chip Law Group

(57) ABSTRACT

The present application is at least directed an apparatus including a non-transitory memory and a processor that is operably coupled to the non-transitory memory for managing a server transition with a service for user equipment (UE). The processor is configured to perform the instructions of receiving, at a core network, a first request from a first server to switch responsibility of the service to a second server to communicate with the UE. The processor is also configured to perform the instructions of determining a first core network terminating point needs updating to a second core network terminating point. The processor is further configured to perform the instructions of selecting the second core network terminating point sends a result of the determination to the user equipment. The processor is still further configured to perform the instructions of sending, to the service, a notification the user equipment is associated with the second core network terminating point. The processor is still yet even further configured to perform the (Continued)

instructions of transmitting, to the UE, a second message notifying the UE characteristics of a session have changed.

20 Claims, 25 Drawing Sheets

Related U.S. Application Data

(60) Provisional application No. 62/376,653, filed on Aug. 18, 2016.

(51) Int. Cl.

| | | |
|---|---|---|
| *H04L 29/08* | (2006.01) | |
| *H04L 29/06* | (2006.01) | |
| *H04W 8/26* | (2009.01) | |
| *H04W 80/10* | (2009.01) | |
| *H04W 88/16* | (2009.01) | |
| *H04L 67/148* | (2022.01) | |
| *H04L 9/40* | (2022.01) | |

(52) U.S. Cl.
CPC .......... *H04W 8/26* (2013.01); *H04W 36/0011* (2013.01); *H04W 36/0033* (2013.01); *H04W 80/10* (2013.01); *H04W 88/16* (2013.01)

(56) References Cited

U.S. PATENT DOCUMENTS

| 2019/0007500 A1 | 1/2019 | Kim et al. |
| 2019/0335369 A1 | 10/2019 | Zhang et al. |
| 2020/0092614 A1 | 3/2020 | Li et al. |

FOREIGN PATENT DOCUMENTS

| CN | 101558674 A | 10/2009 | |
| CN | 101594616 A | 12/2009 | |
| CN | 103703823 A | 4/2014 | |
| CN | 105681320 A | 6/2016 | |
| EP | 1883030 A1 | 1/2008 | |
| WO | 2016/007494 A1 | 1/2016 | |
| WO | 2016/045602 A1 | 3/2016 | |
| WO | 2016/073533 A1 | 5/2016 | |
| WO | WO-2020163635 A1 * | 8/2020 | |
| WO | WO-2021029512 A1 * | 2/2021 | |

OTHER PUBLICATIONS

3GPP TR 22.891 V1.3.2, "3rd Generation Partnership Project; Technical Specification Group Services and System Aspects; Feasibility Study on New Services and Markets Technology Enablers; Stage 1 (Release 14)", Feb. 2016, 95 pages.

3GPP TR 23.799 V0.5.0, 3rd Generation Partnership Project; Technical Specification Group Services and System Aspects; Study on Architecture for Next Generation System (Release 14), May 2016, 372 pages.

3GPP TR 23.799 V0.7.0, "3rd Generation partnership Project; Technical Specification Group Services and System Aspects; Study on Architecture for Next Generation System (Release 14)", Aug. 2016, 322 pages.

3GPP TS 23 203 V13.4.0, "3rd Generation Partnership Project; Technical Specification Group Services and Systems Aspects; Policy and Charging Control Architecture (Release 13)", Jun. 2015, 235 pages.

3GPP TS 23.401 V14.0.0, "3rd Generation Partnership Project; Technical Specification Group Services and System Aspects; General Packet Radio Service (GPRS) Enhancements for Evolved Universal Terrestrial Radio Access Network (E-UTRA) Access (Release 14)", Jun. 2016, 374 pages.

3GPP TS 23.682 V14.0.0, "3rd Generation Partnership Project; Technical Specification Group Services and System Aspects; Architecture Enhancements to Facilitate Communications with Packet Data Networks and Applications (Release 14)" Jun. 2016, 91 pages.

3GPP TS 36.413 V12.1.0, "3rd Generation Partnership Project; Technical Specification Group Radio Access Network Evolved Universal Terrestrial Radio Access Network (E-UTRAN); S1 Application Protocol (S1AP(Release12)", Mar. 2014, 285 pages.

ETSI GS NFV 002 V1.1.1, "Network Functions Virtualisation (NFV); Architectural Framework", Oct. 2013, 21 pages.

Network Functions Virtualisation—Introductory White Paper, "An Introduction, Benefits, Enablers, Challenges & Call for Action", SDN and Openflow World Congress, Dramstadt-Germany, Oct. 2012, 16 pages.

NGMN 5G P1 Requirements & Architecture Work Stream End-to-End Architecture, "Description of Network Slicing Concept" Jan. 2016, 7 pages.

* cited by examiner

NETWORK SERVICE EXPOSURE FOR SERVICE AND SESSION CONTINUITY

CROSS-REFERENCE TO RELATED APPLICATIONS

This application is a continuation of U.S. patent application Ser. No. 16/325,224 filed Feb. 13, 2019 which is the National Stage Application of International Patent Application no. PCT/US2017/047556 filed Aug. 18, 2017, which claims the benefit of priority of U.S. Provisional Application no. 62/376,653, filed Aug. 18, 2016, entitled "Network Service Exposure for Service and Session Continuity" the contents of which are incorporated herein by reference in their entireties.

FIELD

The present application is directed to architectures and techniques for routing mobile traffic between user equipment and application servers.

BACKGROUND

Presently, networks are not provisioned to efficiently handle the stringent requirements of immersive services including but not limited to augmented reality, virtual reality, and ultra-high-definition (UHD) 3D video. Specifically, these immersive services have critical requirements on transfer bandwidth and delay between terminals. As a result, the end user is not provided with the most realistic experience leading to customer dissatisfaction.

In a network, an end-to-end path links user equipment with a service provider at an application server (AS) or service capability server (SCS). Generally, the end-to-end path can be divided into two parts. The first part is a user-plane path within the operator network connecting the end user via user equipment to a core network terminating point (CNTP) of a core network. The second part is an external path within the data network that connects the CNTP of the core network to the AS/SCS.

Delay requirements may not adequately be met when users connected to an immersive service provider change location. Moreover, the move may trigger a change in CNTP ultimately effecting contact information of the user equipment. Since the immersive service provider is not aware of this new contact information, it is unable to communicate with the user equipment.

Presently, the core network and the SCS/AS independently decide how to select the most efficient user plane path and server, respectively. This may be to the detriment of the end user. For example, while the core network can select a new CNTP to optimize the user plane path, the core network does not consider how far it may be located from a SC S/AS. Separately, there is no mechanism to evaluate whether the CNTP should be changed or maintained. This directly impacts delay requirements of the immersive services.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to systems and processes for optimizing mobile traffic flow between user equipment and a SCS/AS.

In one aspect of the application, there is described an apparatus including a non-transitory memory and a processor operably coupled to the non-transitory memory for managing a server transition with a service for user equipment (UE). The processor is configured to perform the instructions of receiving, at a core network, a first request from a first server to switch responsibility of the service to a second server to communicate with the UE. The processor is also configured to perform the instructions of determining a first core network terminating point needs updating to a second core network terminating point. The processor is further configured to perform the instructions of selecting the second core network terminating point sends a result of the determination to the user equipment. The processor is still further configured to perform the instructions of sending, to the service, a notification the user equipment is associated with the second core network terminating point. The processor is still yet even further configured to perform the instructions of transmitting, to the UE, a second message notifying the UE characteristics of a session have changed.

According to another aspect of the application, a method is described for managing a server transition with a service for user equipment (UE). The method includes as step of receiving, at a core network, a first request from a first server to switch responsibility of the service to a second server to communicate with the UE. The also includes a step of determining a first core network terminating point needs updating to a second core network terminating point. The method further includes a step of selecting the second core network terminating point sends a result of the determination to the user equipment. The method further includes a step of sending, to the service, a notification the user equipment is associated with the second core network terminating point. The method yet even further includes a step of transmitting, to the UE, a second message notifying the UE characteristics of a session have changed.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1:
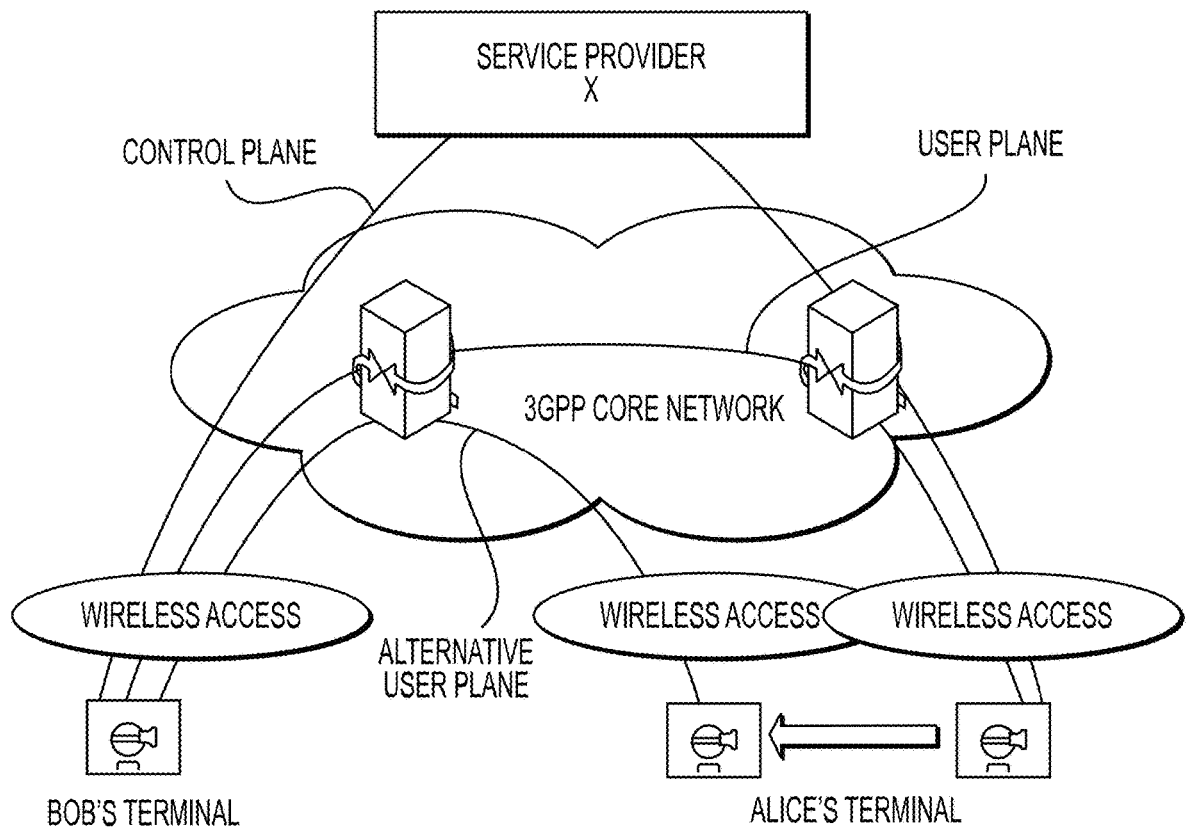
FIG. 1 illustrates application traffic routing after user equipment mobility.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Generally, the present application describes next-generation techniques and systems for optimizing the end-to-end path between the end user and the service provider, e.g., AS/SCS. To do so, the present application describes how to select the best application server out of a list of servers offering the same service. The present application also describes how to select the optimum user-plane path within the operator network. Accordingly, the core network may change the CNTP of a protocol data unit (PDU) session resulting in a change in the user equipment (UE) contact address. The application further describes mechanisms by which the core network informs the SCS/ASs about the change in UE contact information.

In one aspect of the application, the SCS/AS may use a network capability exposure function to query the core network about the UE information. The information may include but is not limited to location and sleep state of a CNTP. In so doing, the SCS/AS can negotiate with another server to handle communications with the UE.

In another aspect for optimizing a user-plane path, the SCS/AS may inform the core network about characteristics of traffic flow. The characteristics may include but are not limited to data volume, data rate, and latency requirements. The characteristics may be used by the core network to determine if a user-plane path should be optimized by changing the CNTP.

In yet another aspect, the core network inquires with the UE about currently active application flows including a list of SCS/ASs. The core network may update the SCS/ASs with the UE's updated contact information. In an embodiment, the core network may employ timers and/or characteristics of flows as triggers prior to updating the SCS/AS.

In yet even another aspect, the core network maintains old and new PDU sessions. Upon reception of mobile terminated traffic at the old CNTP, the core network is triggered to update the UE contact information at the SCS/AS. In an embodiment, the core network may employ timers and/or characteristics of flows as triggers prior to sending updated UE contact information to the SCS/AS.

In yet a further aspect, the core network may receive a query from the SCS/AS about the UE's current UE contact information prior to sending any mobile terminated traffic.

Definitions and Acronyms

Provided below are terms and phrases commonly in Table 1 along with definitions used in this application.

TABLE 1

| ACRONYM | TERM OR PHRASE |
|---|---|
| API | Application Programming Interface |
| AS | Application Server |
| BNG | Broadband Network Gateway |
| CDN | Content delivery network OR Content distribution network |
| CG-NAT | Carrier-grade Network Address Translation |
| CN | Core Network |
| CNTP | Core Network Terminating Point |
| DN | Data Network |
| EPC | Evolved Packet Core |
| ETSI | European Telecommunications Standards Institute |
| GBR | Guaranteed Bit Rate |
| GGSN | Gateway GPRS Support Node |
| GW | Gateway |
| HLR | Home Location Register |
| HSS | Home Subscriber Server |
| IOT | Internet of Things |
| MBR | Minimum Bit Rate |
| MM | Mobility Management |
| MME | Mobility Management Entity |
| M2M | Machine-to-Machine |
| MPTCP | Multi-Path TCP |
| MT | Mobile Terminated |
| NF | Network Function |

TABLE 1-continued

| ACRONYM | TERM OR PHRASE |
|---|---|
| NFV | Network Function Virtualization |
| OTT | Over the Top |
| PDN | Protocol Data Network |
| PDU | Protocol Data Unit |
| QoS | Quality of Service |
| RAN | Radio Access Network |
| SCEF | Service Capability Exposure Function |
| SCS | Service Capability Server |
| SGSN | Serving GPRS Support Node |
| SIP | Session Initiation Protocol |
| SM | Session Management |
| SMS | Short Message Service |
| SMS | Short Message Service - Service Center |
| SSC | Session and Service Continuity |
| TCP | Transmission Control Protocol |
| TUPF | Terminating User Plane Function |
| UE | User Equipment |
| UP | User Plane |
| VNF-FG | Virtual Network Function Forwarding Graph |

The service layer may be a functional layer within network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a common service entity (CSE) or service capability layer (SCL). A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Application Flow: Represents a flow of information from an end user to a server. A PDU session may have multiple application flows, each destined to different servers. The flow can be thought of as a bearer in 4G.

Attachment Station: Entity over which a UE receives wireless access. For example, this may be a cellular base station or a WiFi access point.

Core Network Terminating Point (CNTP): This is network function within the core network that acts as a form of gateway to/from the packet data network. It is the last core network entity for application flows towards the SCS/AS (UL traffic). It is the first core network entity for application flows towards the UE (DL traffic). It typically applies to an entity that carries user plane data, but it can also refer to an entity that carries user plane data over the control plane (for instance an entity similar to the SCEF). Since the CNTF is form of gateway to/from the packet data network, it should be appreciated that CNTF may also be called a PDN-GW, or a PDU Session Anchor User Plane Function (UPF).

Key Issue: This is a 3GPP term to describe an issue that pertains to a proposed new feature. For instance, the next generation architecture study defined in TR23.799 has a number of key issues related to QoS framework, network slicing, mobility management, session management, etc.

Mobile Terminated (MT) Traffic: This is traffic that originates in a packet data network (such as the Internet) and is destined or terminated at a mobile (or UE).

PDU Connectivity Service: A service that provides exchange of PDUs between a UE and a Data Network (DN).

PDU Session: An association between the UE and a data network that provides a PDU Connectivity Service. Two types of PDU sessions are defined:
  IP Type: data network is IP type.
  Non-IP type: data network is non-IP.

Session Continuity: The continuity of a PDU session. For PDU session of IP type, "session continuity" implies that the IP address is preserved for the lifetime of the PDU session.

Service Continuity: The uninterrupted user experience of a service, including the cases where the IP address and/or anchoring point changes.

Service Capability Exposure Function concepts are understood to apply to any network function that exposes an interface, reference point, or API to a server (for example an AS) in order to facilitate similar functionality. For example, this may be the NEF defined for the 5G Core Network.

Application Server: A server located in a data network (outside the core network). Application Server, Service Capability Server, SCS/AS, M2M server, and Application Function are used interchangeably.

UE contact information: Represents some form of address for the UE. For IP based data this is IP address.

Use Cases

Use cases in accordance with the application are described in more detail below. The first use case describes flexible application traffic routing where the user plane path within an operator's network, and potentially the CNTP, may need to be changed. As shown in FIG. 1, Bob and Alice wish to communicate via a 3D augmented reality service. Bob initiates the call by making a request to an augmented reality service provider. The service provider sets up a connection between Bob's terminal and Alice's terminal. Initially, the data follows the user plane path. As Alice moves, she connects to different base stations, and her user-plane path may become inefficient. That is, it may not meet the augmented reality delay requirements. To avoid this, the application traffic should be transported via the alternative, more efficient path between Bob and Alice's terminal.

The second use case describes path optimization techniques where the application server within the external data network may need to be changed. Similar to the first use case, 5G networks will need to support a number of services which have stringent delay and throughput requirements. In some cases, the same services may be offered by a number of alternate servers. To ensure good user experience for these services, the service should use the server nearest to the end-user. The operator network needs to ensure that an optimized data path exists between the end-user and server.

Figure 2:
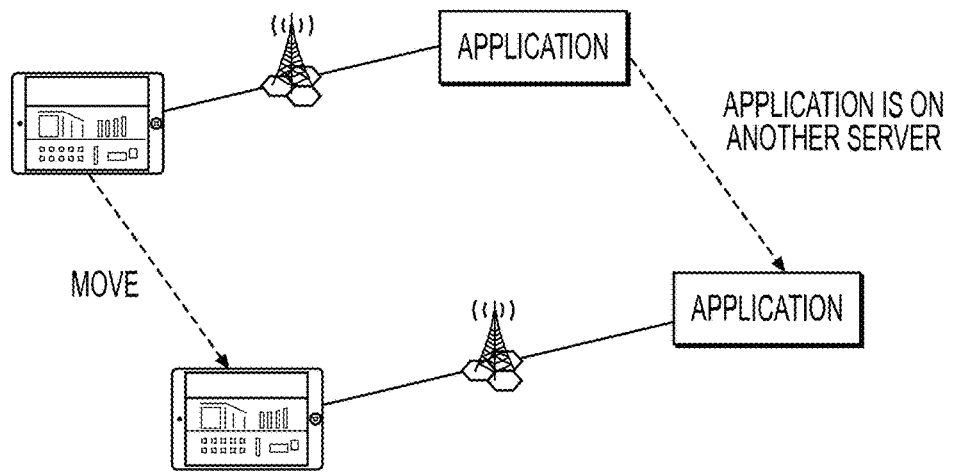
FIG. 2 illustrates a routing path optimization when a server location changes.

As an example, a service provider may provide a memory intensive application for enterprise users. These enterprise users may run the application on the server and use their terminals simply for display purposes. In order to ensure a good service experience, the service provider may deploy the application in multiple servers in order to keep the active application as near as possible to the user when the user moves. This allows the server to better meet the latency requirements of the application, and to minimize the transfer times when a large amount of data needs to be transferred to the user. As illustrated in FIG. 2, a user uses his tablet to display the results of an application running on a server. As the user moves, the service provider decides to activate/instantiate the application on another server closer to the new user location to ensure consistent user experience.

Figure 3:
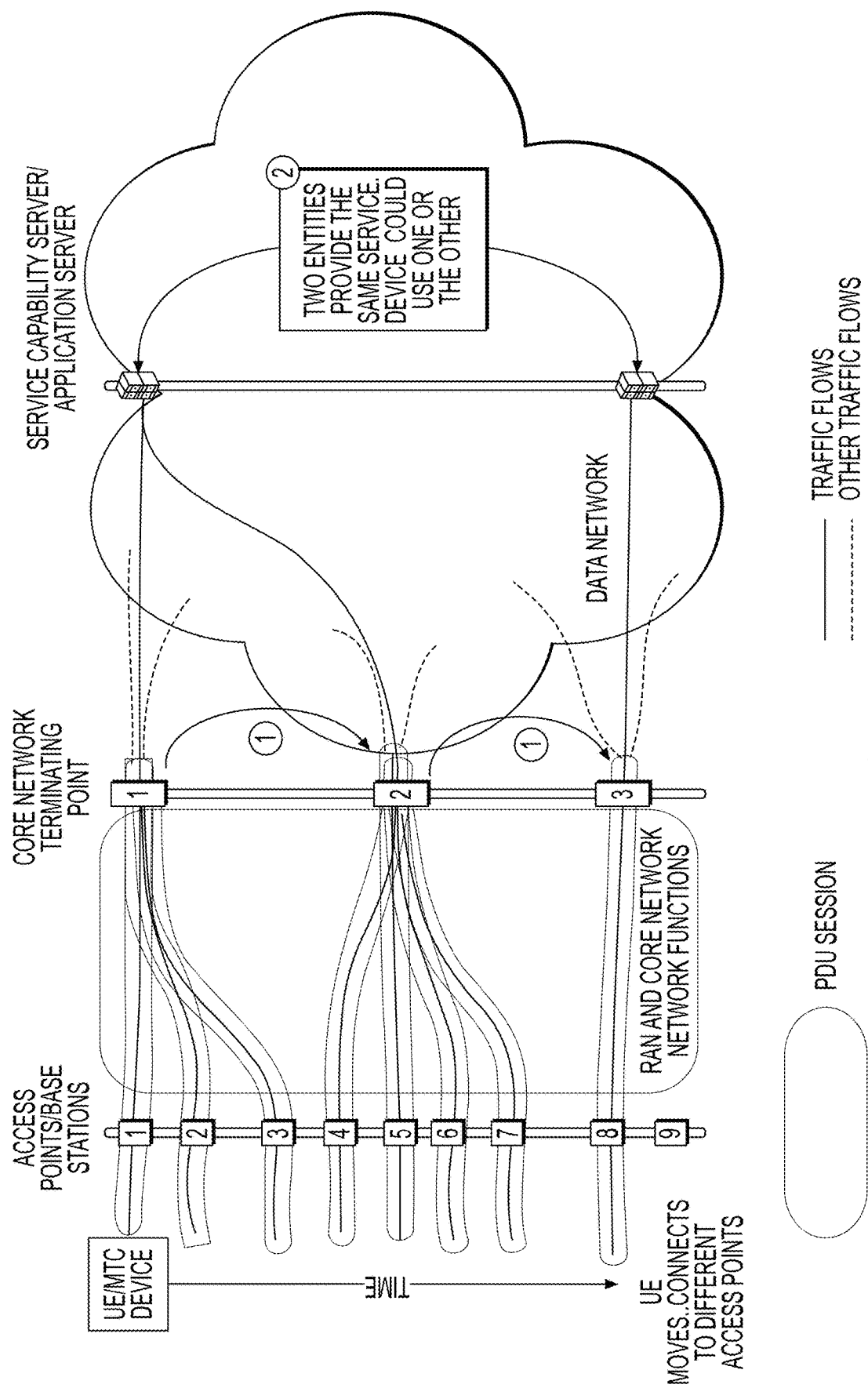
FIG. 3 illustrates a use case based upon FIGS. 1 and 2.

In another use case exemplarily illustrated in FIG. 3, the network has a number of attachment stations (labelled 1-9) and 3 CNTPs (labelled CNTP 1-3). The attachment stations 1-3 belong to the serving area of CNTP 1. Attachment stations 4-7 belong to the serving area of CNTP 2. Attachment stations 8-9 belong to the serving area of CNTP 3. In this use case, the UE has a number of ongoing application flows in its PDU session. As shown by the circled number 2, one of the application flows is targeting a service available at two SCS/ASs. Over time, if the UE changes its user plane path (labelled as squares no. 1-9), the SCS/AS providing the service (marked as circle no. 2) may need to be changed to another SCS/AS based upon mobility/location and load balancing. This new server is illustrated by the SCS/AS at the bottom right of FIG. 3. Separately, a CNTP of the core network may need to be changed in order to be geographically closer to the server.

Figure 4:
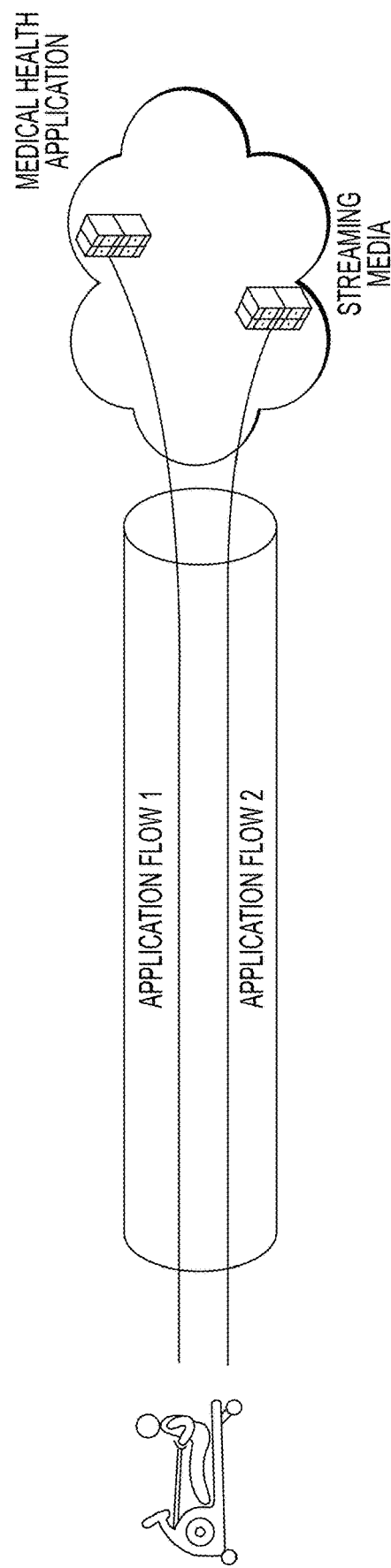
FIG. 4 illustrates multiple application flows in a single packet data unit session.

In another use case as exemplarily shown in FIG. 4, a user has a PDU session with two application flows. Application flow 1 has a low data rate, high priority and requires extremely low latency. Meanwhile, Application flow 2 has a very high data rate with low priority. Here, the core network considers the requirements of both application flows in determining whether to change the user plane path. If the user plane path is changed, this consequently changes the CNTP.

Network Function Virtualization (NFV)

Figure 5:
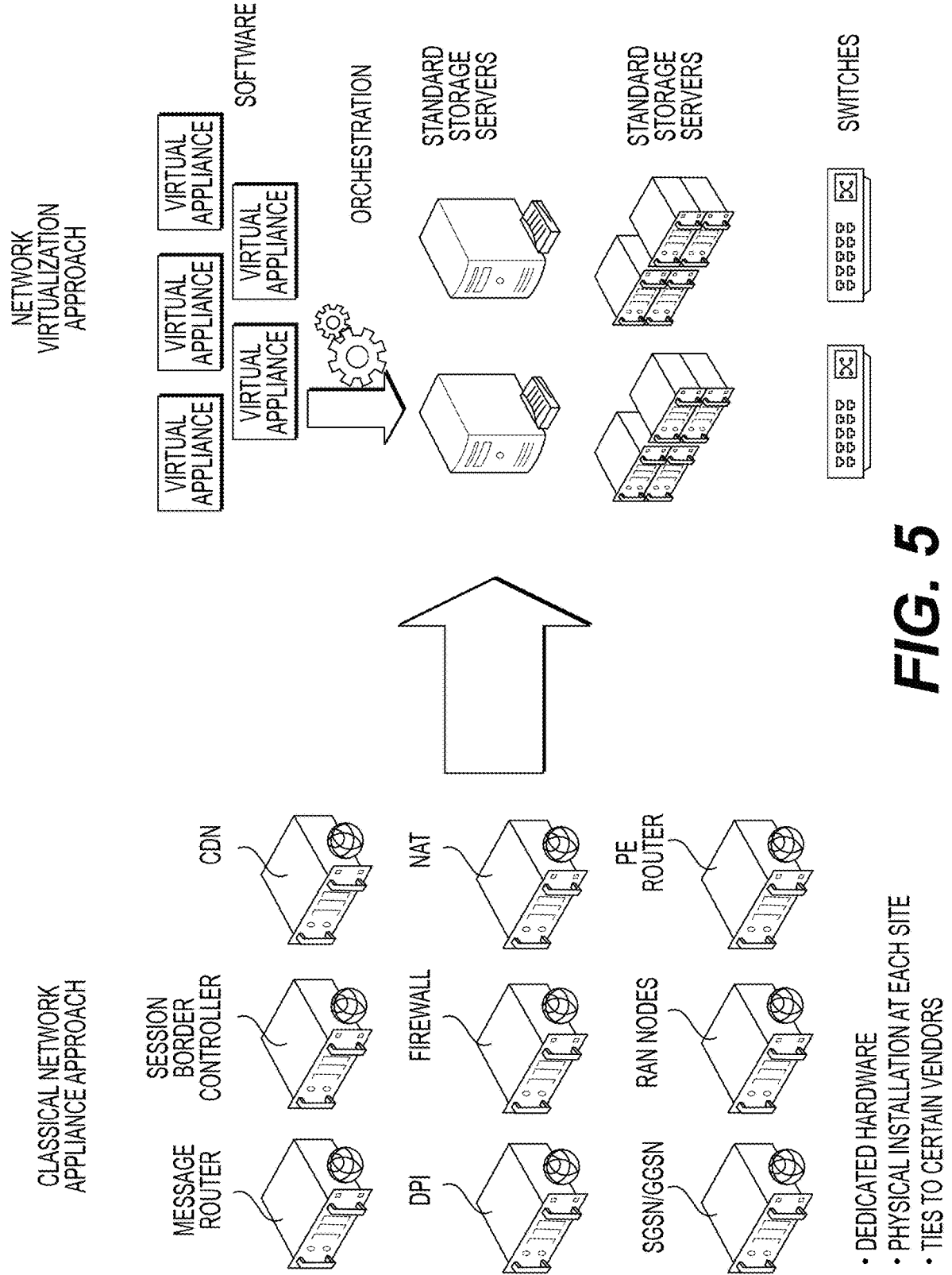
FIG. 5 illustrates an exemplary network function virtualization.

NFV aims to transform the way that network operators architect networks by evolving standard IT virtualization technology to consolidate many network equipment types onto industry standard high volume servers, switches and storage, which could be located in Data centers, Network Nodes and in the end user premises. It involves the implementation of network functions (e.g., mobility management, session management, QoS) in software that can run on a range of industry standard server hardware, and that can be moved to, or instantiated in, various locations in the network as required, without the need for installation of new equipment. An exemplary illustration is provided at FIG. 5.

NFV is applicable to any data plane packet processing and control plane function in mobile and fixed networks. These may include but are not limited to: (ii) switching elements (BNG, CG-NAT, and routers); (ii) mobile network nodes (HLR/HSS, MME, SGSN, GGSN/PDN-GW, RNC, and eNodeB); (iii) functions contained in home routers and set top boxes to create virtualized home environments; (iv) converged and network-wide functions (AAA servers, policy control and charging platforms); (v) application-level optimization (CDNs, Cache Servers, Load Balancers, and Application Accelerators); and (vi) security functions (Firewalls, virus scanners, intrusion detection systems, and spam protection).

Application of NFV brings many benefits to network operators, contributing to a dramatic change in the telecommunications industry landscape. NFV could bring the following benefits: (i) Reduced equipment costs and reduced power consumption through consolidating equipment and exploiting the economies of scale of the IT industry; (ii) increased velocity of Time to Market by minimizing the typical network operator cycle of innovation; (iii) the possibility of running production, test and reference facilities on the same infrastructure provides much more efficient test and integration, reducing development costs and time to market; (iv) targeted service introduction based on geography or customer sets is possible. Services can be rapidly scaled up/down as required; (v) enabling a wide variety of eco-systems and encouraging openness; (vi) optimizing network configuration and/or topology in near real time based on the actual traffic/mobility patterns and service demand; (vii) supporting multi-tenancy thereby allowing network operators to provide tailored services and connectivity for multiple users, applications or internal systems or other network operators, all co-existing on the same hardware with appropriate secure separation of administrative domains; and (viii) reduced energy consumption by exploiting power management features in standard servers and storage, as well as workload consolidation and location optimization.

Figure 6:
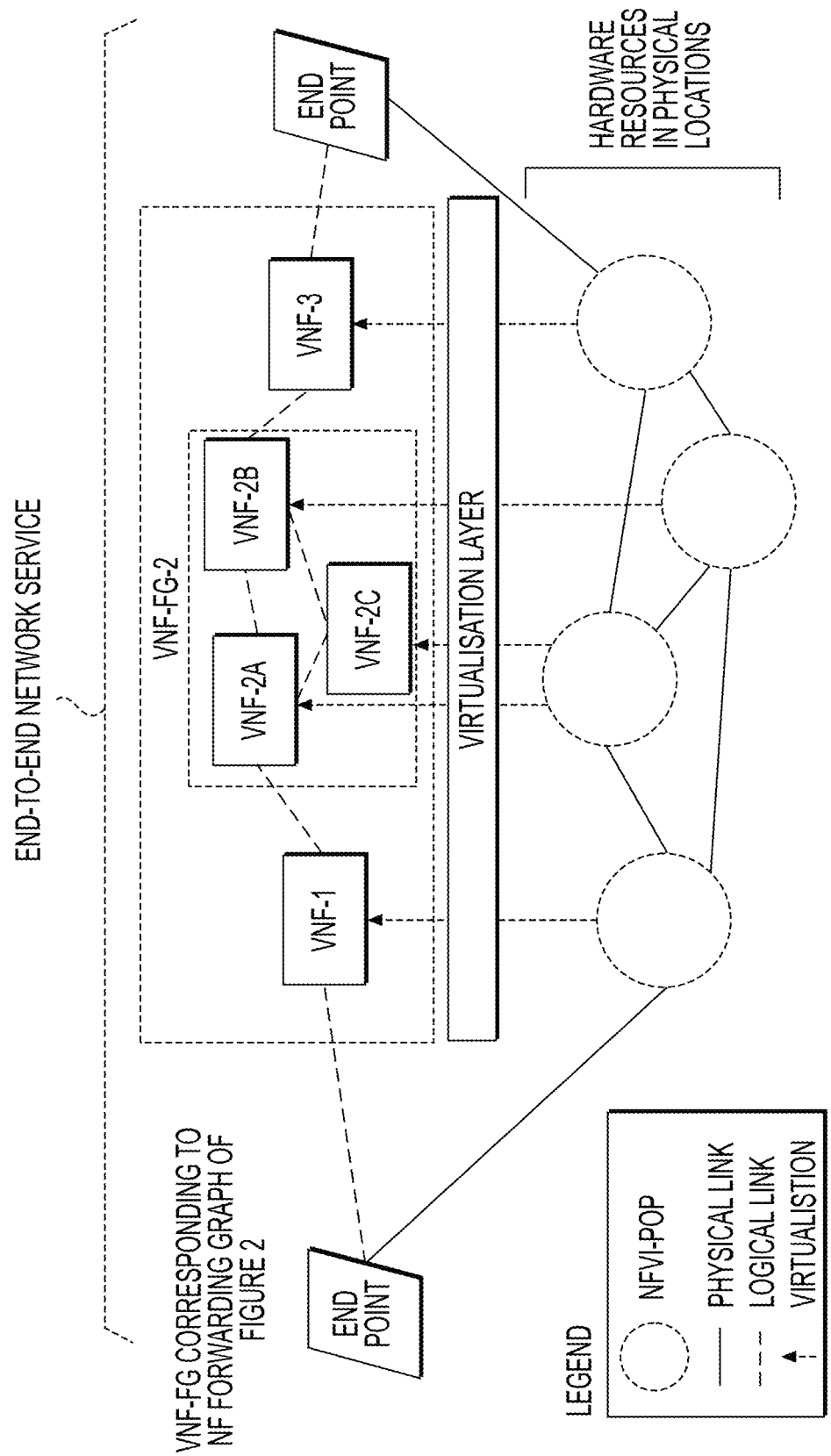
FIG. 6 illustrates an exemplary end-to-end network service with virtual network functions and nested forwarding graphs.

European Telecommunications Standards Institute (ETSI) has formed a specification group "Network Functions Virtualization" to publish some white papers, and to produce several more in-depth materials, including standard terminology definitions and use cases for NFV that act as references for vendors and operators considering implementing NFV. FIG. 6 is an illustration of an ETSI publication that establishes an Architectural Framework for applying NFV concepts to the Mobile Core Network. This figure illustrates the concept of a Virtualized Network Function Forwarding Graph (VNF-FG). A VNF-FG describes how a set of VNF's are connected to provide a service.

Architecture for Next Generation System

Network Slicing is a mechanism that could be used by mobile network operators to support multiple 'virtual' networks behind the air interface across the fixed part of the mobile operator's network, both backhaul and core network. This involves 'slicing' the network into multiple virtual networks to support different RANs or different service types running across a single RAN. Network slicing enables the operator to create networks customized to provide optimized solutions for different market scenarios which demands diverse requirements, e.g., in the areas of functionality, performance and isolation.

Figure 7:
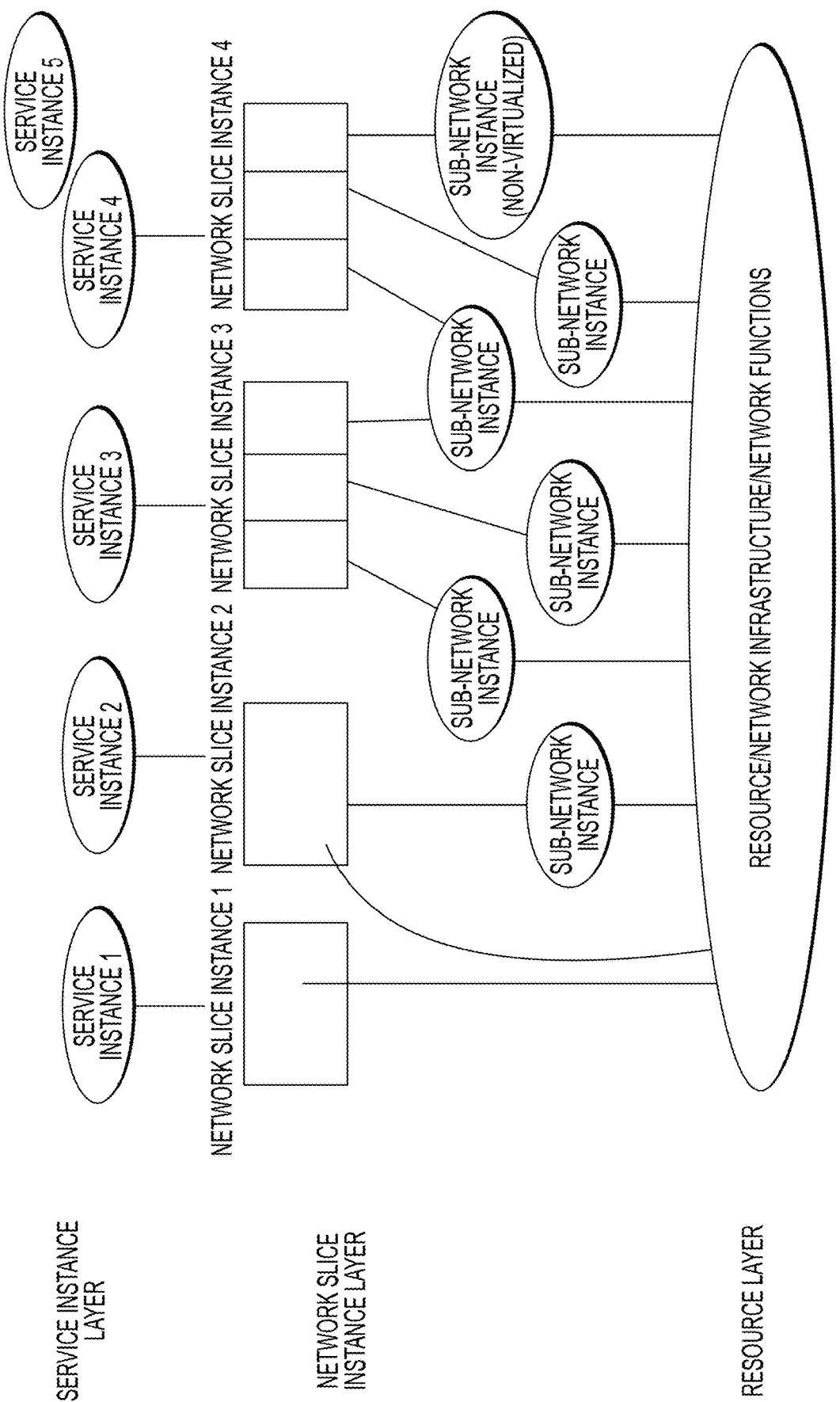
FIG. 7 illustrates an exemplary network slicing model.

FIG. 7 shows a conceptual architecture of network slicing. For example, the network slice instance is made up of a set of network functions and the resources to run these network functions. Moreover, different colors are used to indicate the different network slice instances or sub-network slice instances. A sub-network slice instance includes a set of network functions and resources to run those network functions, but is not in itself a complete logical network. A sub-network slice instance may be shared by multiple network slice instances Network Slicing in 5G Core Network 3GPP is designing a 5G network and considering incorporating the network slicing technology described above. This technology is a good fit for the 5G network, because the 5G use cases (e.g., massive IoT, critical communications, and enhanced mobile broadband) demand very diverse and sometimes extreme requirements. The current pre-5G architecture utilizes a relatively monolithic network and transport framework to accommodate a variety of services, such as for example, mobile traffic from smart phones, OTT content, feature phones, data cards, and embedded M2M devices.

Network slicing enables the operator to create networks customized to provide optimized solutions for different market scenarios which demand diverse requirements, e.g., in the areas of functionality, performance and isolation. However, there are some challenges and issues to support network slicing in the future 5G network. These challenges include, for example, (i) how to achieve isolation/separation between network slice instances and which levels and types of isolation/separation will be required; (ii) how and what type of resource and network function sharing can be used between network slice instances; (iii) how to enable a UE to simultaneously obtain services from one or more specific network slice instances of one operator; (iv) what is within 3GPP scope with regards to Network Slicing (e.g., network slice creation/composition, modification, deletion); (v) which network functions may be included in a specific network slice instance, and which network functions are independent of network slices; (vi) the procedure(s) for selection of a particular Network Slice for a UE; (vii) how to support Network Slicing Roaming scenarios; (viii) how to enable operators to use the network slicing concept to efficiently support multiple 3rd parties (e.g., enterprises, service providers, content providers, etc.) that require similar network characteristics.

Network Capability Exposure Function

One network function being investigated by 3GPP is related to allowing 3rd parties (or UEs) to gain access to information regarding services provided by the network. These services include but are not limited to connectivity, QoS, and mobility. This enables the 3rd party to access and exchange information with the core network and to potentially customize network capability for different use cases. The exchange is envisaged to be via an Application Programming Interface (API).

This is in line with the service capability exposure standardized for pre-5G networks and which allows an SC S/AS to (i) configure monitoring events at an MME or a HSS, and receive event reports based on these monitored events; (ii) to request to be notified about network status/issues, and receive network status reports (either one-time or periodically, depending on configuration); (iii) send background data to a set of UEs, for instance by requesting a time window for delivery; and (iv) to configure communication patterns associated with a UE, thereby allowing the network to better manage the communication to/from the UE.

Figure 8:
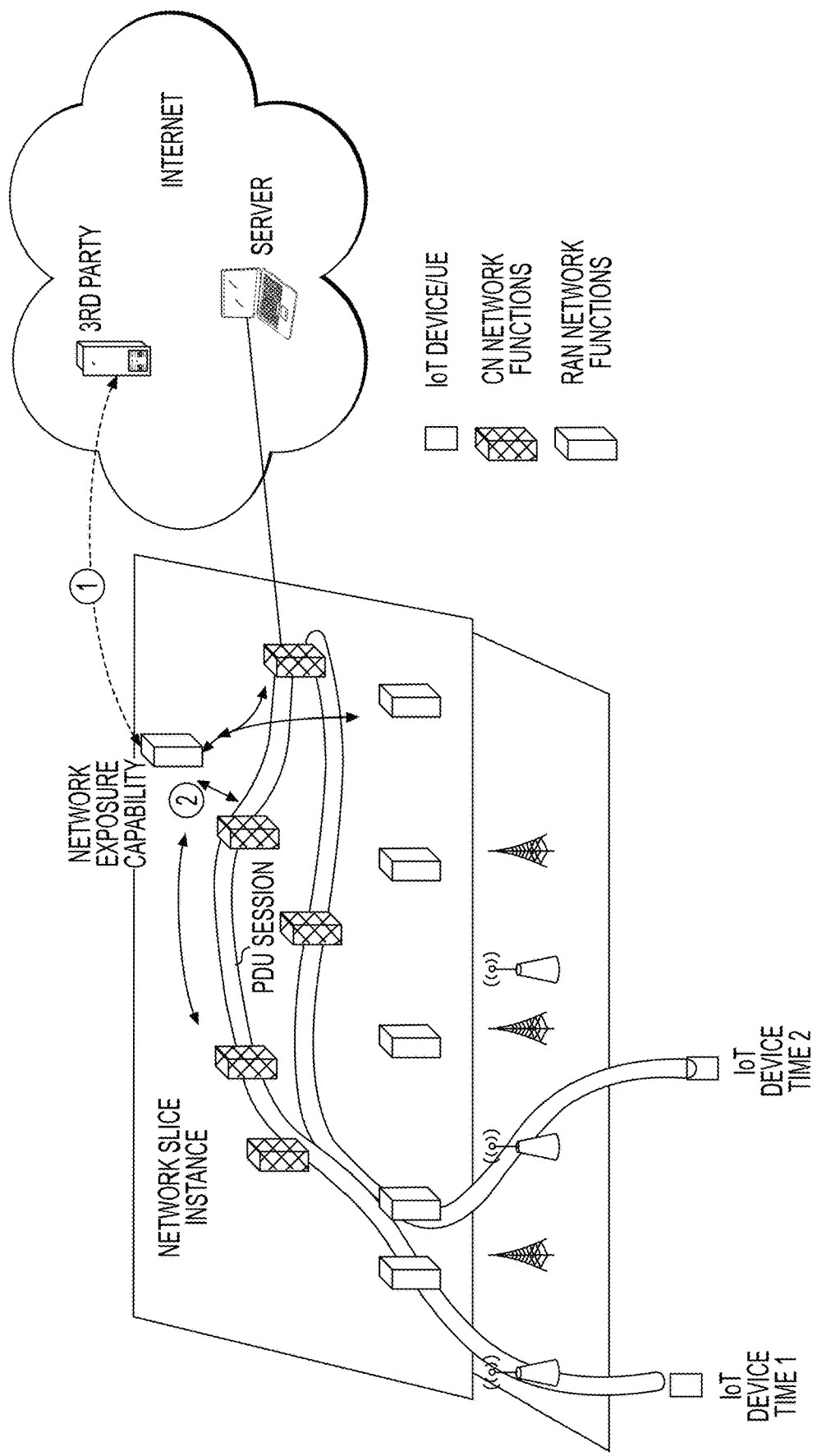
FIG. 8 illustrates an exemplary third party using a network exposure capability.

FIG. 8 shows an example of a network with a single network slice. Here a 3rd party service can use the Network Exposure function (circle no. 1) of the network slice to gain access to network functions inside the network (circle no. 2). In pre-5G networks, the exposure function is referred to as the Service Capability Exposure Function (SCEF), while in 5G systems, the exposure function is referred to as the Network Exposure Function (NEF).

Packet Data Unit Sessions for Next Generation System

The NextGen architecture and the 5G Core Network (5GCN) have introduced the concept of a PDU session. This is an association between a UE and a data network. The PDU session terminates at a CNTP. The CNTP is similar to the PDN-GW within the EPC. Within 3GPP, this entity is also sometimes referred to as the TUPF or as a PDU Session Anchor UPF. Both CNTP and TUPF will be used interchangeably in this document.

Figure 9:
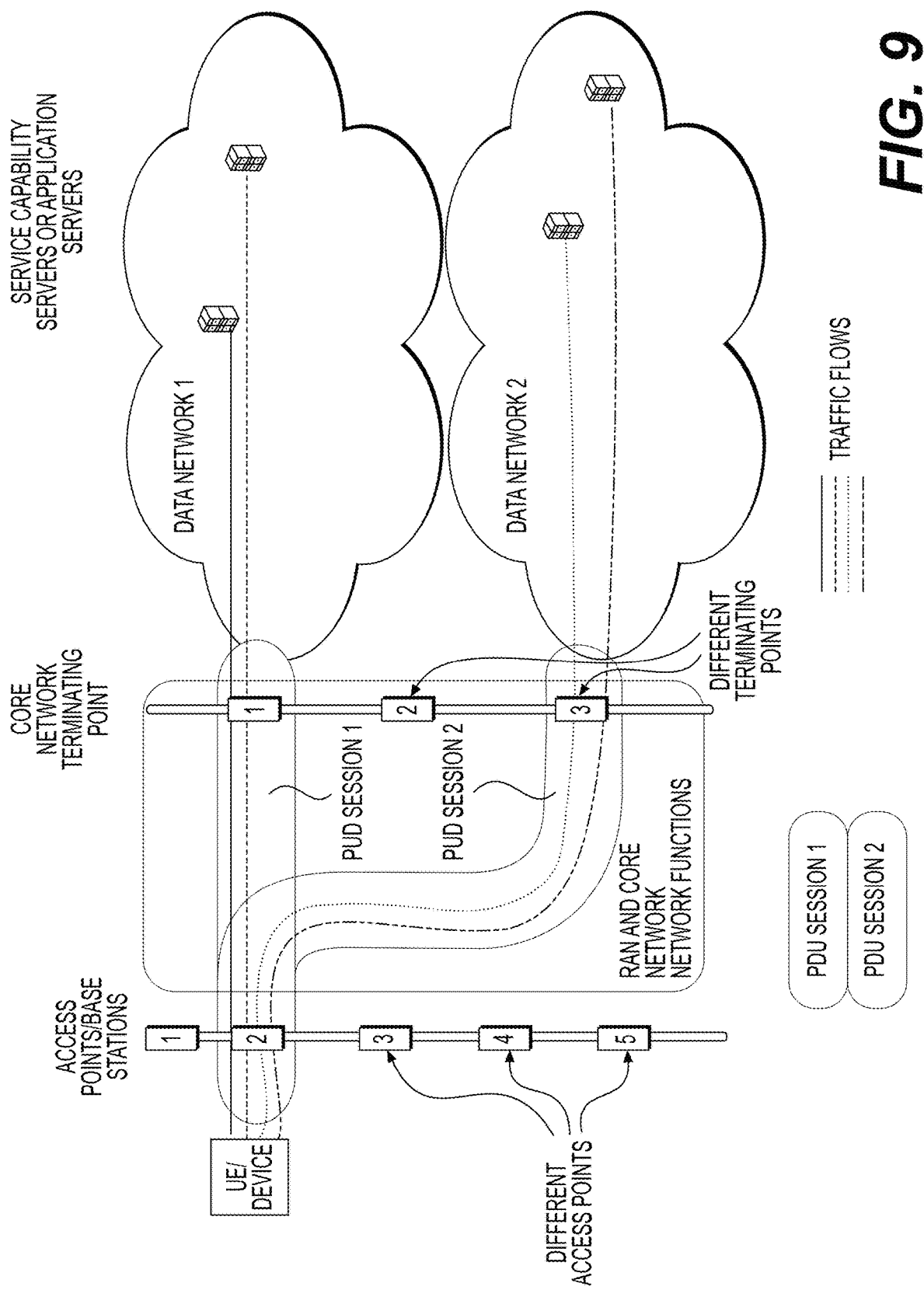
FIG. 9 illustrates exemplary packet data unit sessions and core networking terminating points.

Within each PDU session, a UE may have multiple application flows going to the data network. Each of these flows may have its own QoS requirements. PDU sessions may be of two types: IP and Non-IP. A UE may have more than one active PDU session. FIG. 9 shows an example of a UE with 2 PDU sessions (one towards Data Network 1 and the other towards Data Network 2). Note that both PDU sessions each have 2 application/traffic flows. Each of the traffic flows communicates with SCSs and/or ASs.

Management of PDU Sessions in Next Generation System

3GPP has identified a number of interrelated "key issues" all related to the management of PDU sessions. These include for example (i) session management, (ii) QoS framework, (iii) efficient user-plane paths, and (iv) session and service continuity. Each is described in turn below.

The session management key issue mainly addresses how to: (i) set-up a session between a UE and a data network, (ii) select the user plane network functions required for the session, and (iii) assign an address to the UE.

Each of the sessions is associated with a certain QoS. The QoS key issue addresses how to: (i) characterize the traffic in the PDU session (GBR, MBR, priority), (ii) determine where the control and enforcement of the QoS will be applied, and (iii) identify the traffic to apply the enforcement.

In some cases, the user plane path of a session is inefficient. In such cases, the path may be re-selected. This results in a change in the PDU session anchor point. This results in the third key issue of re-selecting a user plane path. This issue addresses how to: (i) Identify traffic that needs to have its user plane path reselected; and (ii) Reselect user plane path between UE and one of a: (a) a peer outside mobile network; (b) a neighbor UE; and (c) a service hosting entity at an edge of the mobile network.

However, once a user plane path has been reselected, the issue of session and service continuity needs to be addressed. Specifically, this includes how to: (i) determine the type of continuity to be applied to a session, (ii) provide various flavors of session continuity and service continuity when a user plane path is reselected, and (iii) apply different levels of session continuity to different sessions of a UE.

Service and Session Continuity

The NextGen system is envisaged to support three session and service continuity (SSC) modes. These include SSC mode 1, SSC mode 2, and SSC mode 3. In SSC Mode 1, the same CNTP is maintained regardless of the access technology (e.g., RATs and cells) that a UE is using to access the network. The mode requires a fixed IP address during the whole period of active PDU sessions, thus guaranteeing session continuity and IP reachability.

Figure 10:
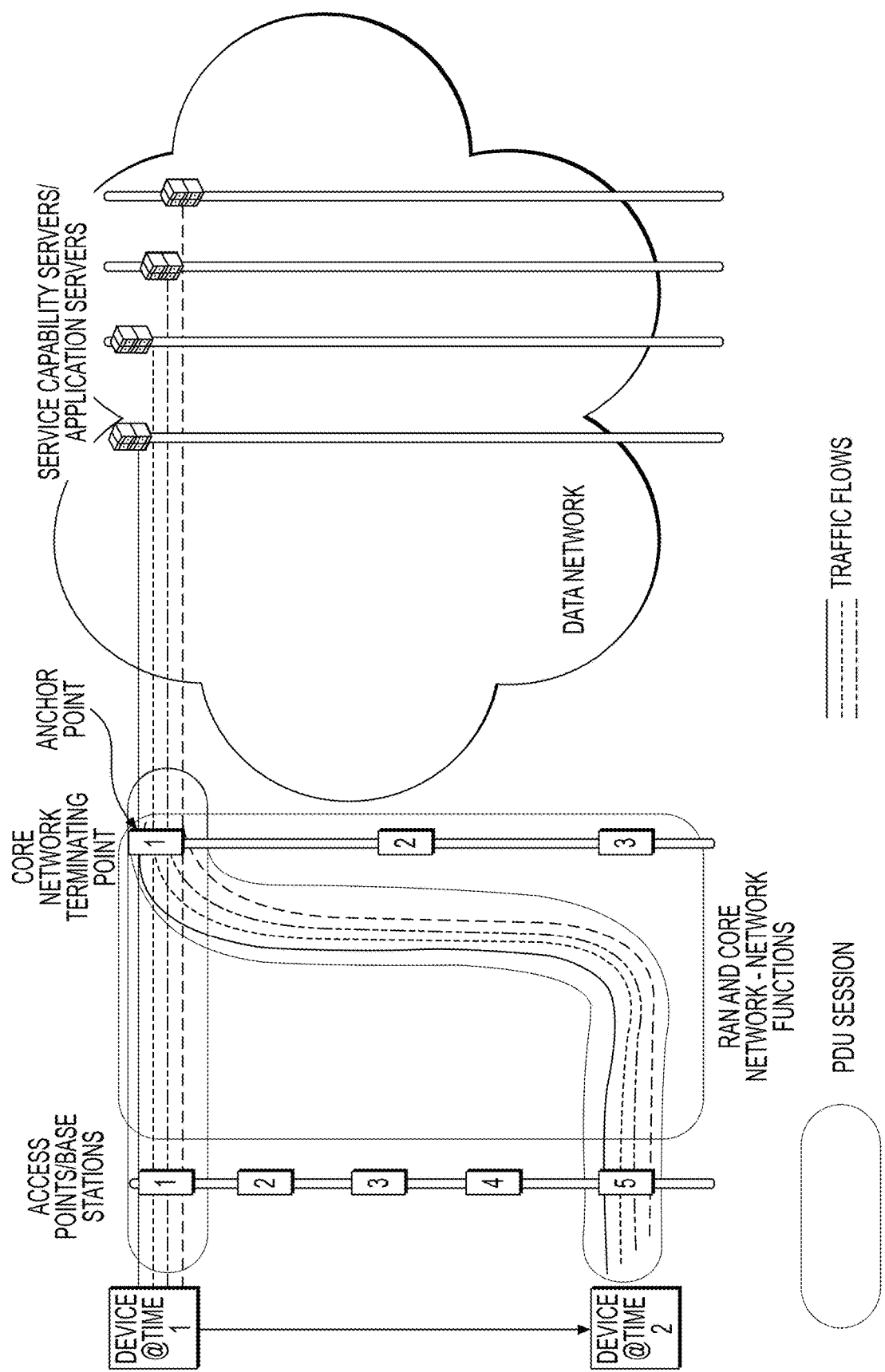
FIG. 10 illustrates an exemplary session and service continuity mode 1, protocol data unit session.

FIG. 10 shows an example where a UE has a single PDU session with four active application flows. Each of these flows is destined to a different SCS/AS. At time 1, the UE connects to the network through the attachment station 1, and uses the CNTP 1 to access the data network. The UE is assigned a UE contact address by the core network. For this example, the CNTP may assign an IP address to the UE. At time 2, the UE has moved and connects through attachment point 5. As the UE is using SSC Mode 1, its PDU session remains with CNTP 1. This is the single mode that is allowed in pre-5G cellular networks. The PDN-GW (acting as the CNTP) is the anchor point for all UE mobility.

In SSC mode 2, the same CNTP is only maintained across a subset (i.e. one or more, but not all) of the access network attachment stations (e.g., cells and RATs). It should be appreciated that access network attachment stations can be WLAN APs, 5G gNBs, 4G eNBs, etc.). This subset of attachment stations is referred to as the serving area of the CNTP. When the UE leaves the serving area of a CNTP, the UE will be served by a different CNTP suitable for the UE's new point of attachment to the network. SSC Mode 2 allows the change of IP addresses in the middle of active PDU sessions, possibly leading to suspended session. The SSC mode 2 may be considered a "break before make" approach. Namely, as the old PDU session is broken (or suspended) first, then a new session is started. The UE will be provided with new UE contact information by the new CNTP.

Figure 11:
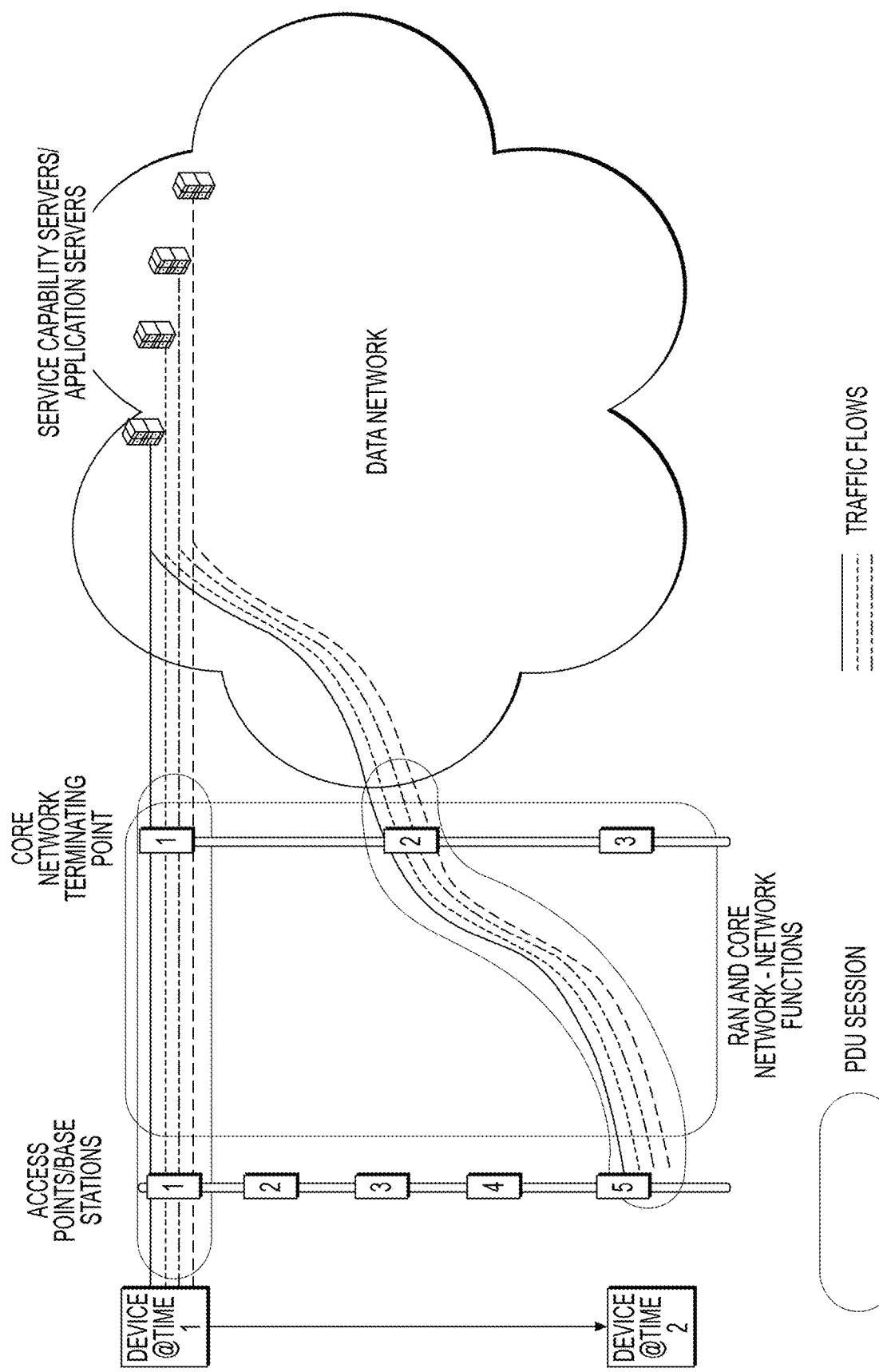
FIG. 11 illustrates an exemplary session and service continuity mode 2, protocol data unit session.

FIG. 11 shows an example where a UE has a single PDU session with four active application flows. Each of these flows is destined to a different SCS/AS. At time 1, the UE connects to the network through the attachment station 1, and uses the CNTP 1 to access the data network. The UE is assigned a UE contact address by the core network. For this example, the CNTP may assign an IP address to the UE. In order to reduce the transmission latency within the RAN and core network, the operator would like to have the attachment stations served by the CNTP that is geographically closest. As a result, the operator has defined serving areas for each of the CNTPs. In the example shown, attachment stations 1-4 belong to the serving area on CNTP 1, while attachment station 5 belongs to the serving area of CNTP 2. As the UE moves and changes its attachment station (from station 1-4), the PDU session remains anchored at CNTP 1. However at time 2, the UE connects to attachment station 5 (which belongs to a different CNTP serving area). As a result, the PDU session, and all the application flows on this session, is migrated to CNTP 2. During this migration the original PDU session is broken or suspended.

Figure 12:
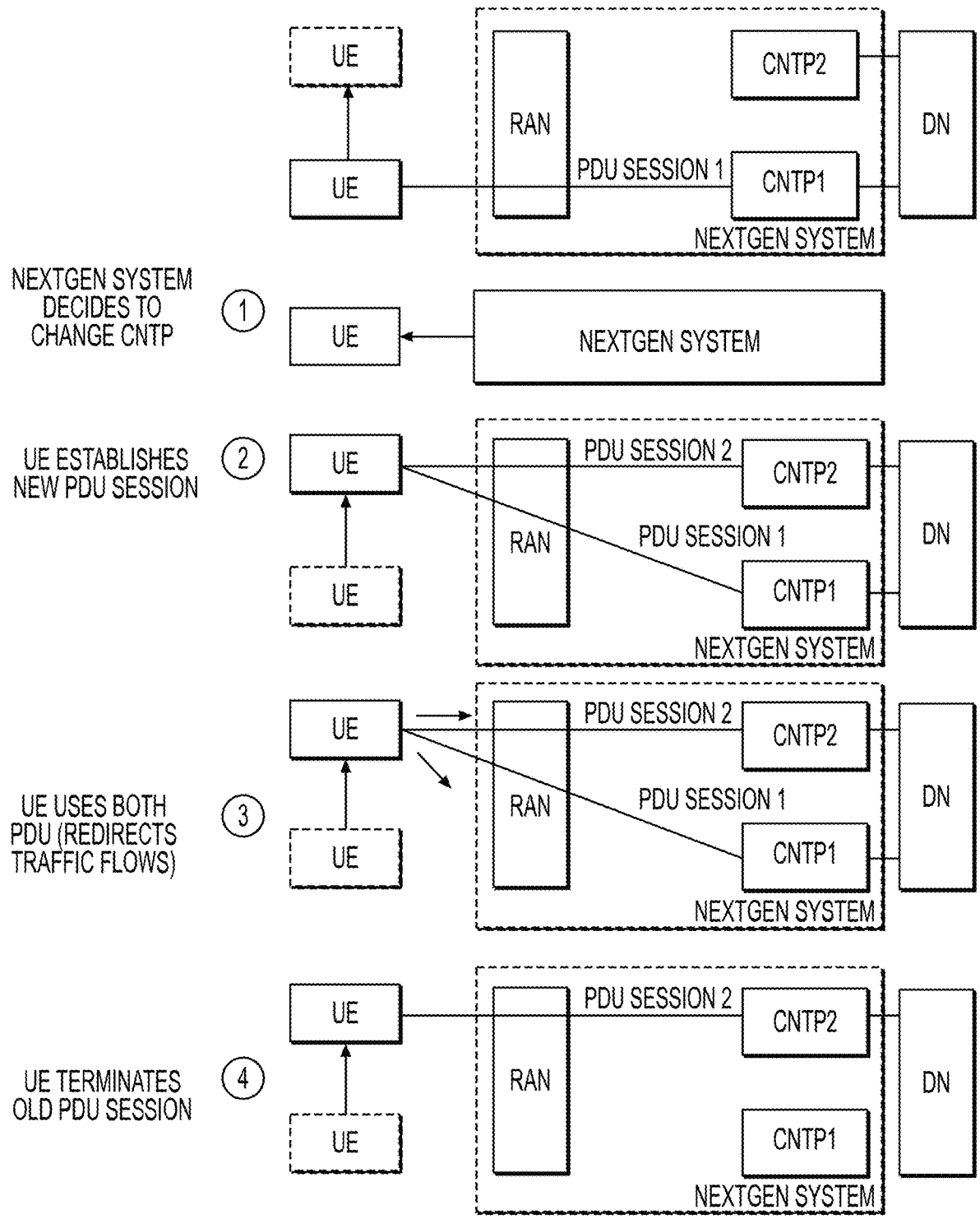
FIG. 12 illustrates an exemplary session and service continuity mode 3, protocol data unit session.

Further in SSC mode 3, the network allows the UE to establish an additional PDU session to the same data network (DN) before the previous PDU session is eventually terminated. This is illustrated in FIG. 12. When the UE requests the additional PDU session, the network selects a target CNTP suitable for the UE's new point of attachment to the network. While both PDU sessions are active, the UE either actively rebinds applications from the previous to the new PDU session, or alternatively, the UE waits for flows bound to the previous PDU connection to end. This mode allows the change of IP addresses for application flows destined to the same data network (DN), but requires session continuity. So, the SSC mode 3 accompanies a redirection procedure. This approach may be considered as a "make before break" option since a new PDU session is established before the old session is deleted. In each of the three SSC modes, it should be appreciated that assigning an IP address to an IPv4 UE is equivalent to assigning an IP prefix to an IPv6 UE.

When the NextGen system decides that the UE needs to change its CNTP, it indicates to the UE that one of its active PDU sessions needs to be redirected. The UE establishes a new PDU session to the same data network. The network will select the CNTP based on the UEs new point of attachment. Once the new PDU session is established, the UE has various options to redirect the traffic flows. The UE redirects application flows bound to the previous PDU session to the new PDU session (using upper layer session continuity mechanism). The UE steers new flows to the new session and waits for the old flows to terminate before closing the old PDU session. Once traffic in old PDU session is finished, or a timer expires, the old PDU session is deleted.

Application-Aware Path (Re) Selection

The NextGen system is also envisioned to have some application awareness for user plane path (re)selection. This may involve some interactions between the application servers and the network functions responsible for user plane path (re)selection. One of the solutions described in TR23.799 relies on an AS controller communicating with the NextGen Control plane network function to request a user plan path (re)selection. The AS controller is a function under the control of the operator and within the trusted domain, and is assumed to have a certain knowledge of the topology of the CN User plane with respect to the AS network. In the (re)selection request, the AS controller may provide the UE identify as well as a list of user plane functions that are suitable and/or unsuitable for (re)selection. Alternatively, the solution also considers the case that the NextGen system decides to change its user plane path (due to mobility or load balancing). In such a case, the NextGen system notifies the AS controller about the change in user plane path. In response, the AS controller may inform the AS network. Based on the new user plane path, the AS network may decide to change the AS that is providing service to the UE.

Application-awareness will likely play a very important role in session management for the NextGen system. However, the solution presented in TR23.799 has some shortcomings. First, the user plane path selection and the AS selection are managed independently. Once a selection is made, the selection information is communicated between the NextGen system and the AS controller, however, the selection decision is not made jointly. Secondly, the triggers to perform a reselection are based only on mobility and load balancing. Many other triggers may be possible. Thirdly, the information shared between the NextGen system and the AS controller is quite limited. If the two sides communicate, the application-awareness should be expanded to allow exchange of additional information that may improve the (re)selection decisions.

General Architecture

Figure 13A:
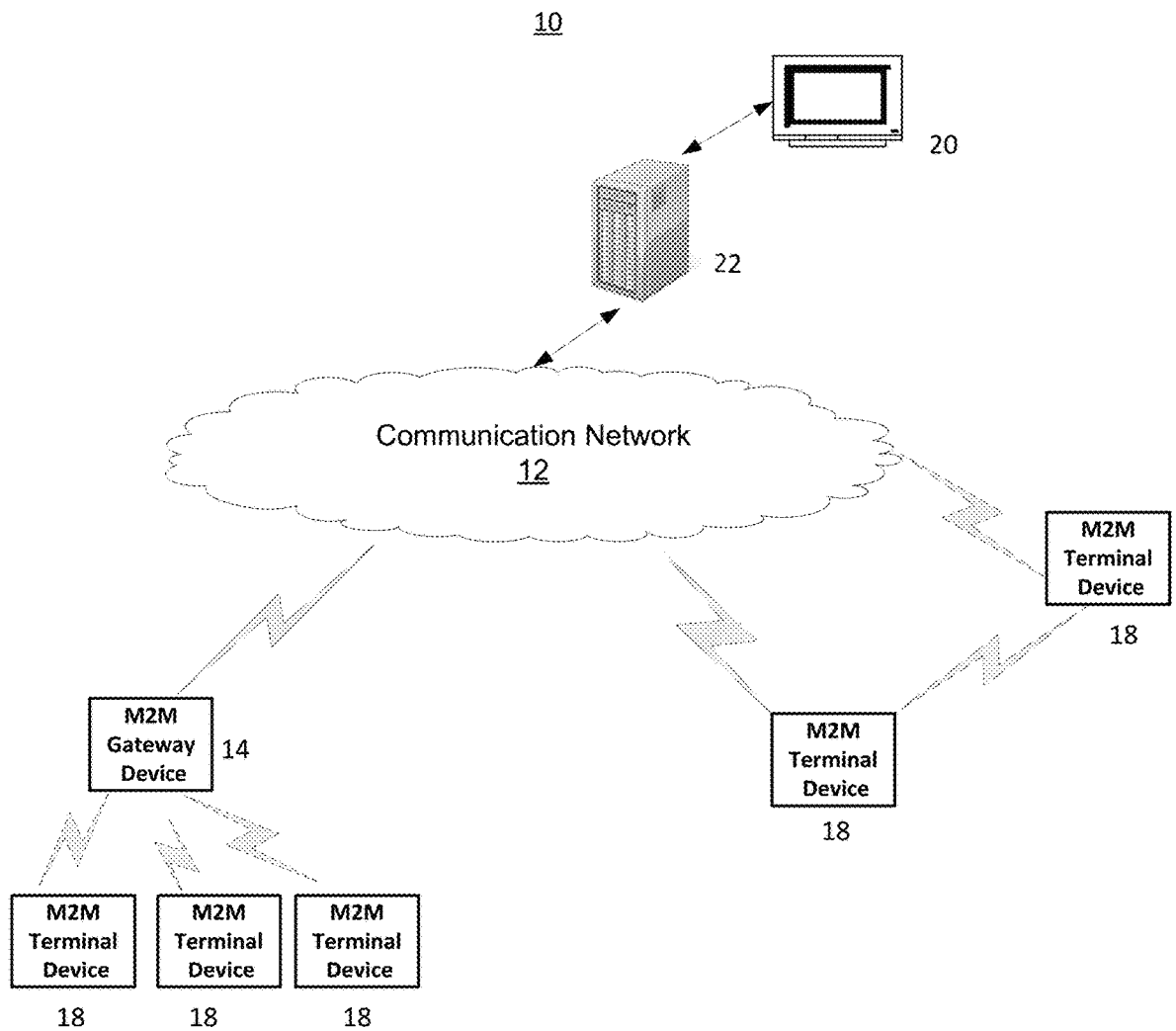
FIG. 13A illustrates a system diagram of an exemplary machine-to-machine or Internet of Things communication system in which one or more disclosed embodiment may be implemented.

FIG. 13A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 13A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. In one embodiment, the services may include immersive services to end users such as augmented reality, virtual reality, and ultra-high definition 3D videos. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a satellite network, a home network, or an enterprise network for example.

Figure 13B:
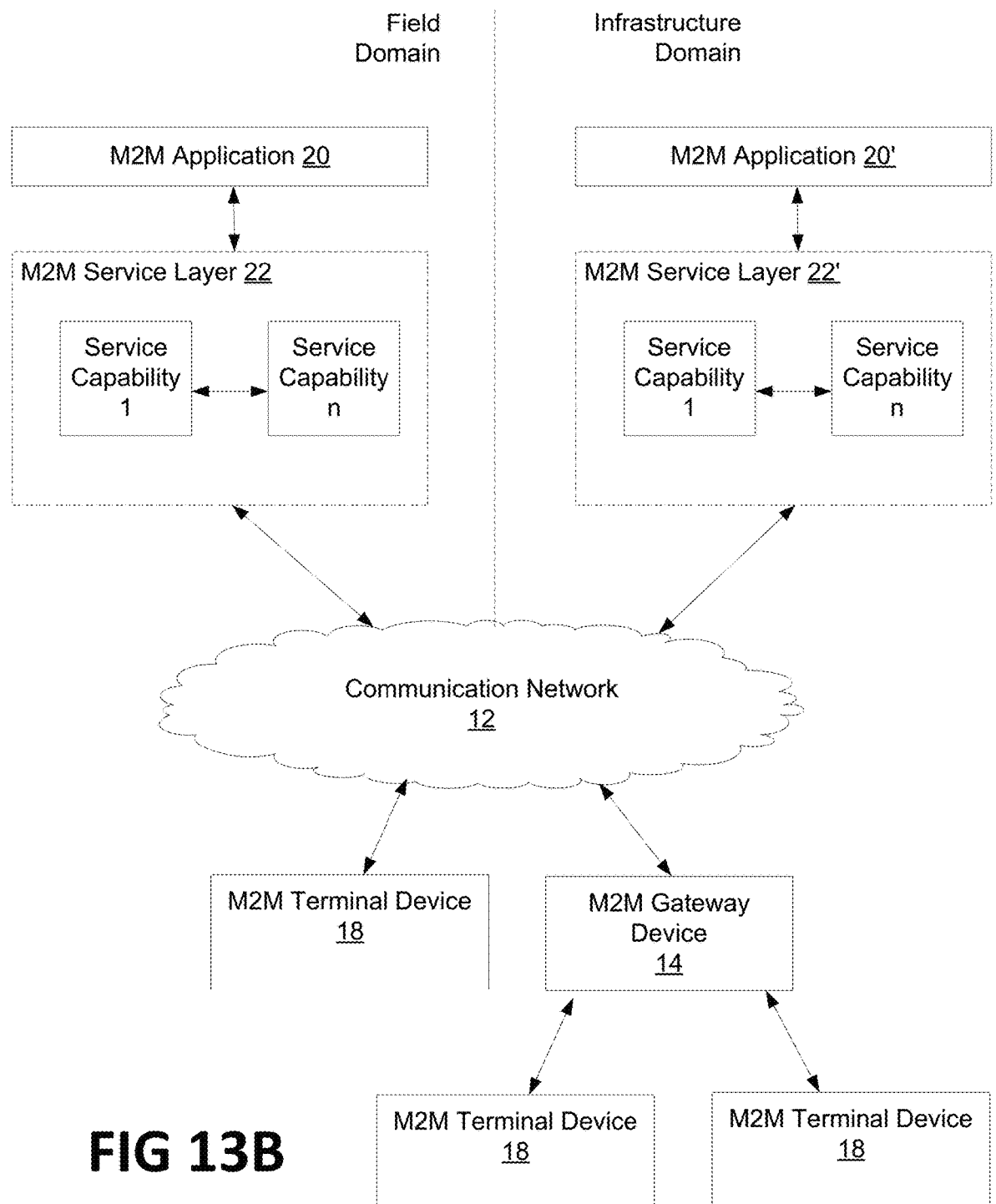
FIG. 13B illustrates an embodiment of the application of a M2M service platform.

As shown in FIG. 13B, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a SCS and/or an AS with a proxy, and terminal devices 18, such as UE devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN, e.g., Zigbee, 6LoWPAN, Bluetooth, direct radio link, and wireline for example.

Referring to FIG. 13B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, such as for example transit CSEs, M2M terminal devices 18, such as host CSEs and Originators, as well as communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 13B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location Tracking/geo-fencing, device/service discovery, and legacy systems integration, and provides these functions as services to the M2M applications 20 and 20'. Moreover, the M2M service layer may also be configured to interface with other devices such as UEs, SCSs and MMES on the core network as discussed in this application and illustrated in the figures.

The service layer is a software middleware layer that supports value-added service capabilities through a set of Application Programming Interfaces (APIs) and underlying networking interfaces. ETSI M2M's service layer is referred to as the SCL. The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE), such as a SCS which may be hosted on different types of network nodes, e.g., infrastructure node, middle node, application-specific node.

Figure 13C:
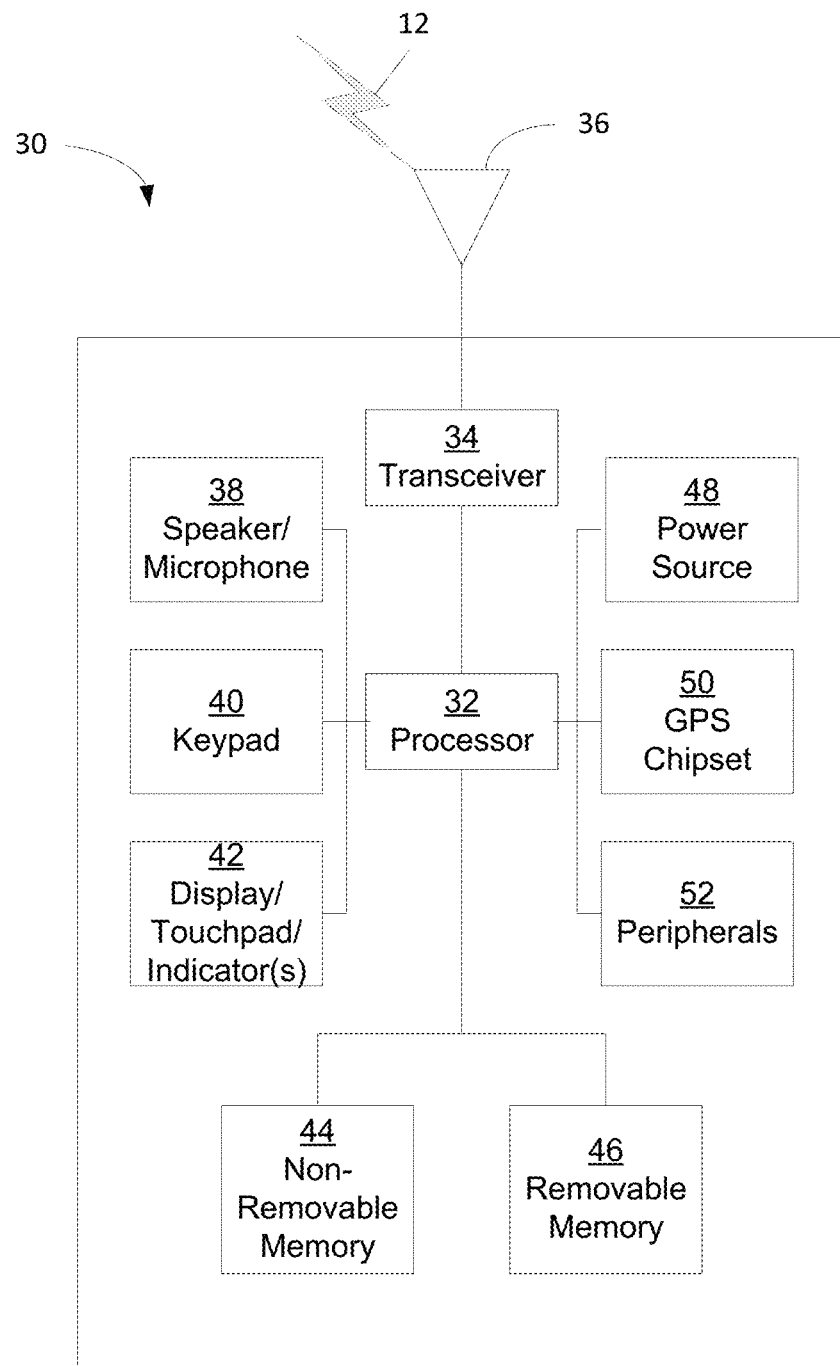
FIG. 13C illustrates an embodiment of the application of a system diagram of an example M2M device.

FIG. 13C is a system diagram of an example M2M device 30, such as a M2M terminal device 18 or an M2M gateway device 14 for example. As shown in FIG. 13C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. The display may include one or more graphical user interfaces as shown for example in FIG. 18. It will be appreciated that the M2M device 40 may include any sub-combination of the foregoing elements while remaining consistent with an embodiment. The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 13C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 13C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include sensors such as an accelerometer, a biometrics (e.g., fingerprint) sensor, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 13D:
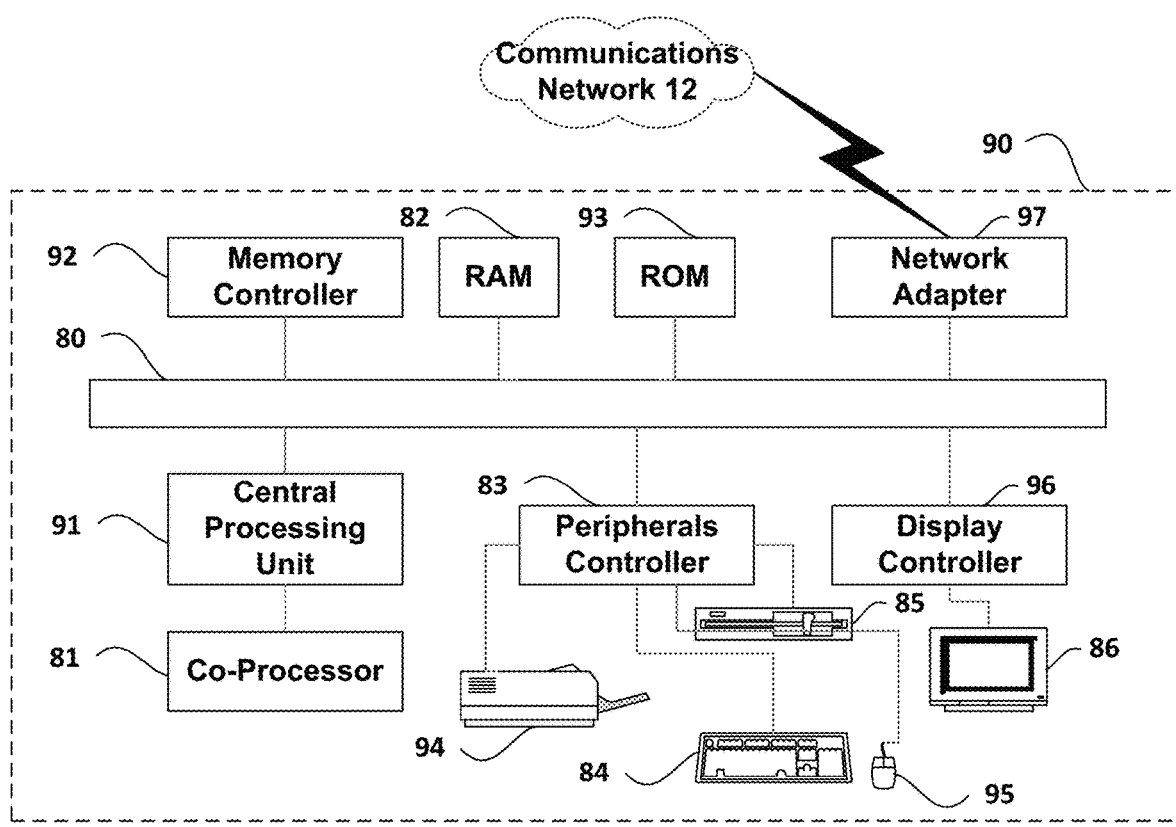
FIG. 13D illustrates an embodiment of the application of an M2M or 5G computing system.

FIG. 13D is a block diagram of an exemplary computing system 90 on which, for example, the M2M service platform 22 of FIG. 13A and FIG. 13B may be implemented, and in in which one or more apparatuses of the communications network illustrated in FIGS. 13E, 13F, 13G, and 13H may be embodied. These may include certain nodes or functional entities in the RAN 103/104/105, core network 106,107/109, PSTN 108, Internet 110, or other networks 112.

Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. This may include, for example, discovery results for multi-hop discovery, conditional discovery and hosting CSE redirect. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. The display may include a graphical user interface (GUI) as shown for example in FIG. 18. Further, computing system 90 may contain network adaptor 97 that may be used to connect computing system 90 to an external communications network, such as network 12 of FIG. 13A and FIG. 13B. The computing system 90 may also contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 13E, 13F, 13G, 13H, and 13I, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive e-call, disaster alerts, real-time gaming, multi-person video calls, autonomous driving, augmented reality, tactile internet, and virtual reality to name a few. All of these use cases and others are contemplated herein.

Figure 13E:
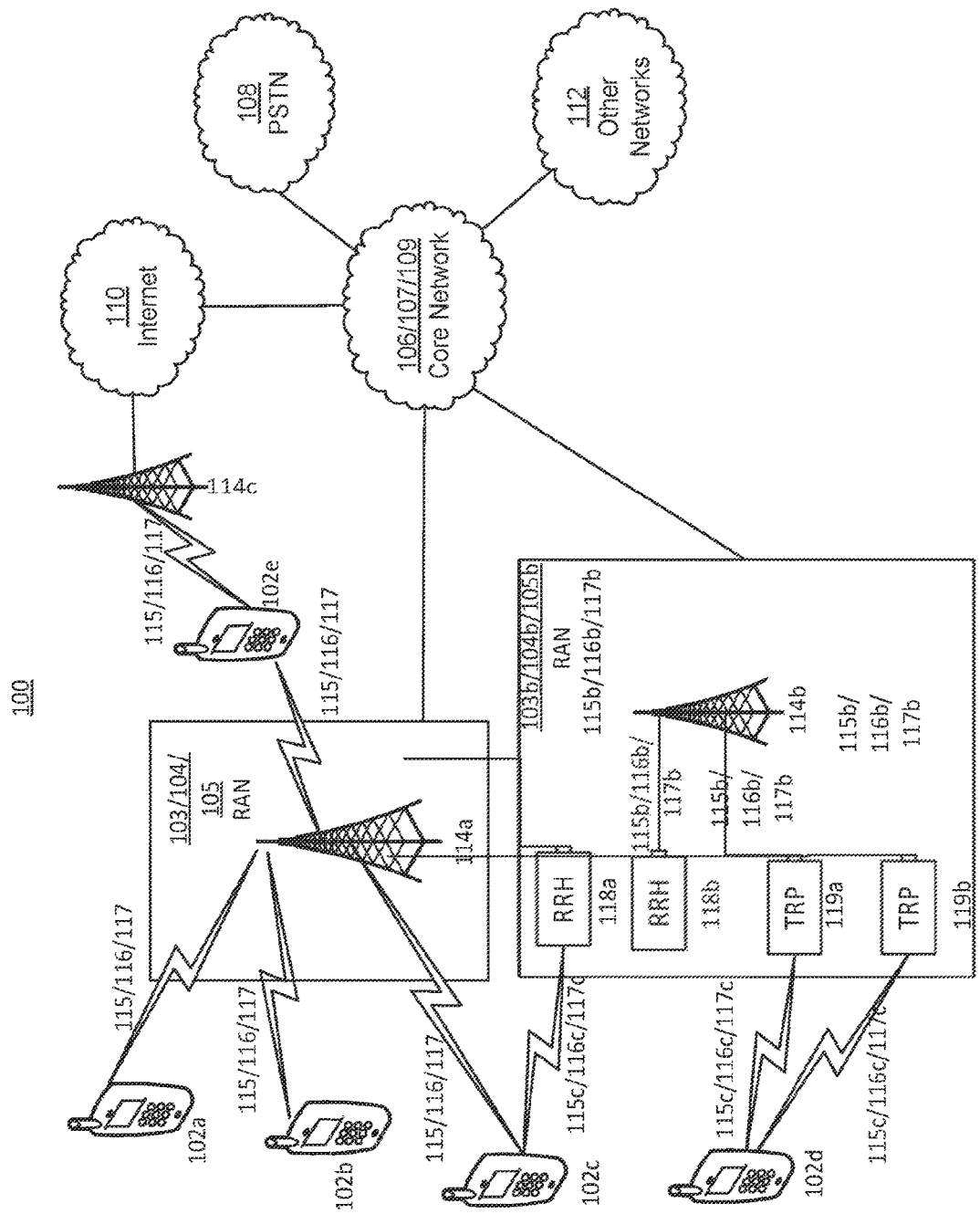
FIG. 13E illustrates one embodiment of an example communications system in which the methods and apparatuses described and claimed herein may be embodiment.

FIG. 13E illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 13E-I as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 13E may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 13E, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 13D, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 13E may be configured to communicate with the base station 114a, which may employ a cellular-based radio technology, and with the base station 114c, which may employ an IEEE 802 radio technology.

Figure 13F:
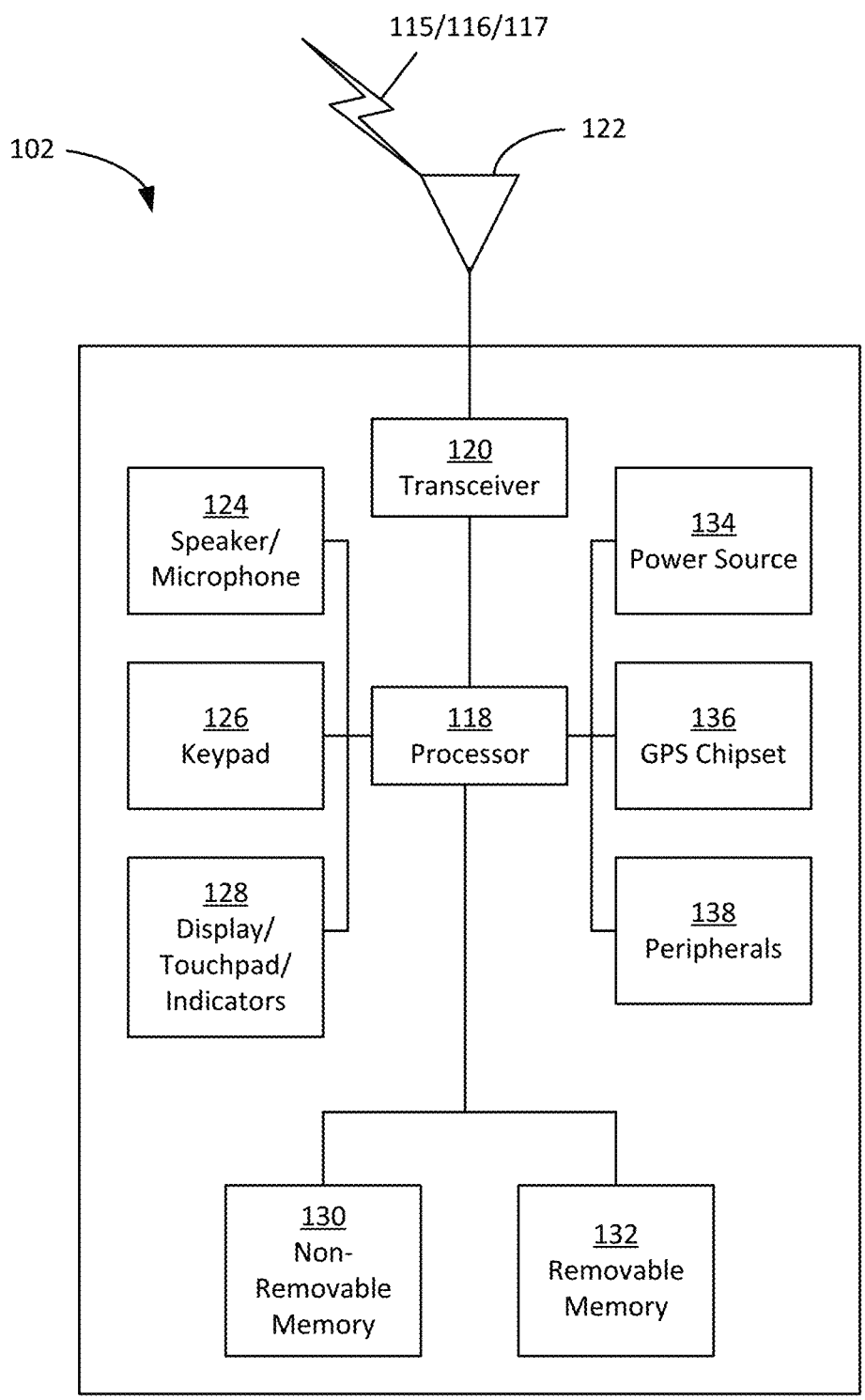
FIG. 13F is a block diagram of an example apparatus or device configured for wireless communications in accordance with the embodiments illustrated herein.

FIG. 13E is a block diagram of an example apparatus or device configured for wireless communications in accordance with the embodiments illustrated herein, such as for example, a WTRU 102. As shown in FIG. 13F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13F depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 13E, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 13E may be configured to communicate with the base station 114a, which may employ a cellular-based radio technology, and with the base station 114b, which may employ an IEEE 802 radio technology.

FIG. 13F is a block diagram of an example apparatus or device configured for wireless communications in accordance with the embodiments illustrated herein, such as for example, a WTRU 102. As shown in FIG. 13F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13F depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/

117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13F as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 13G:
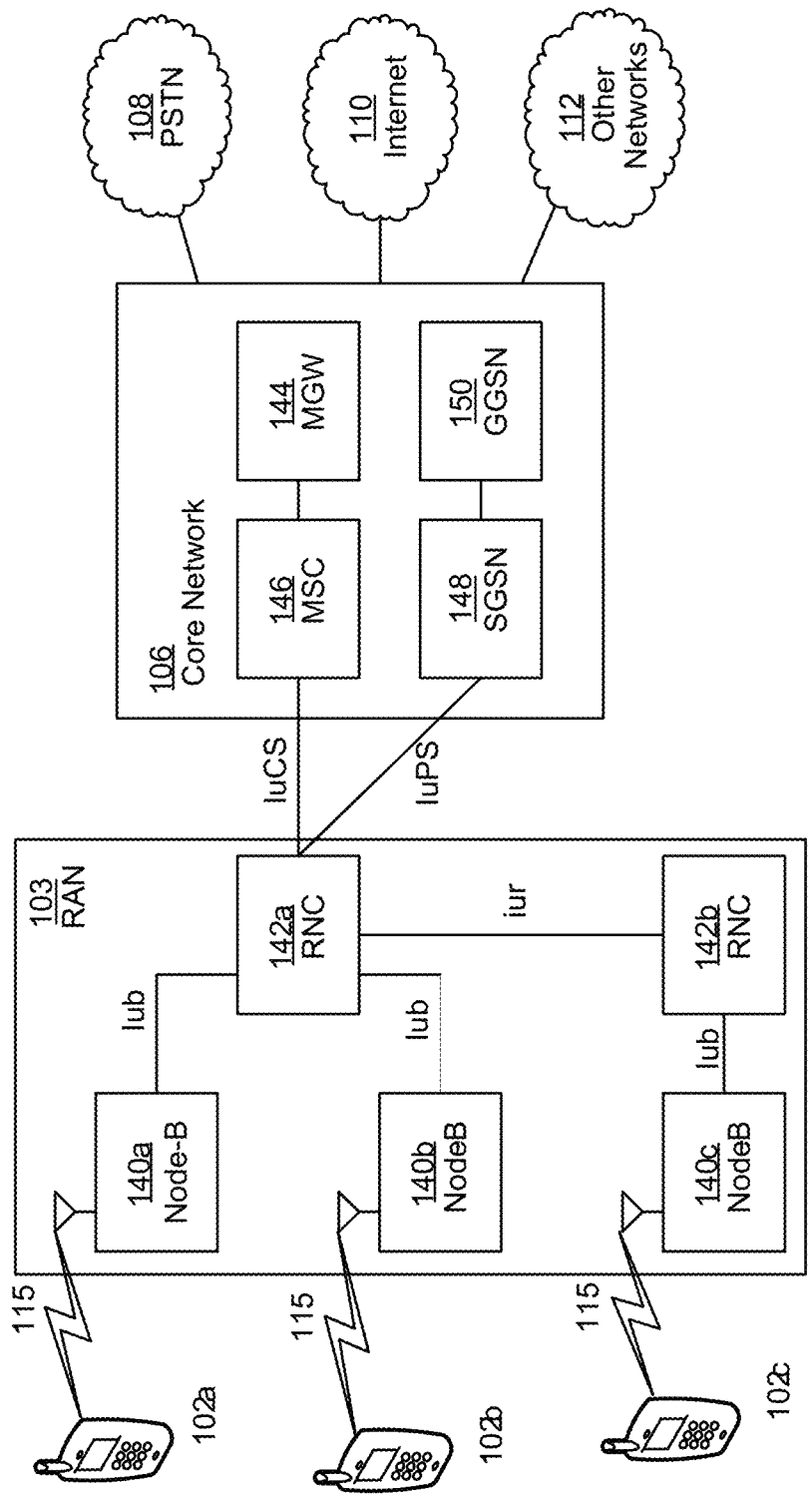
FIG. 13G is a system diagram of the RAN and the core network according to an embodiment.

FIG. 13G is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 13G, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 13G, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 13G may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 13H:
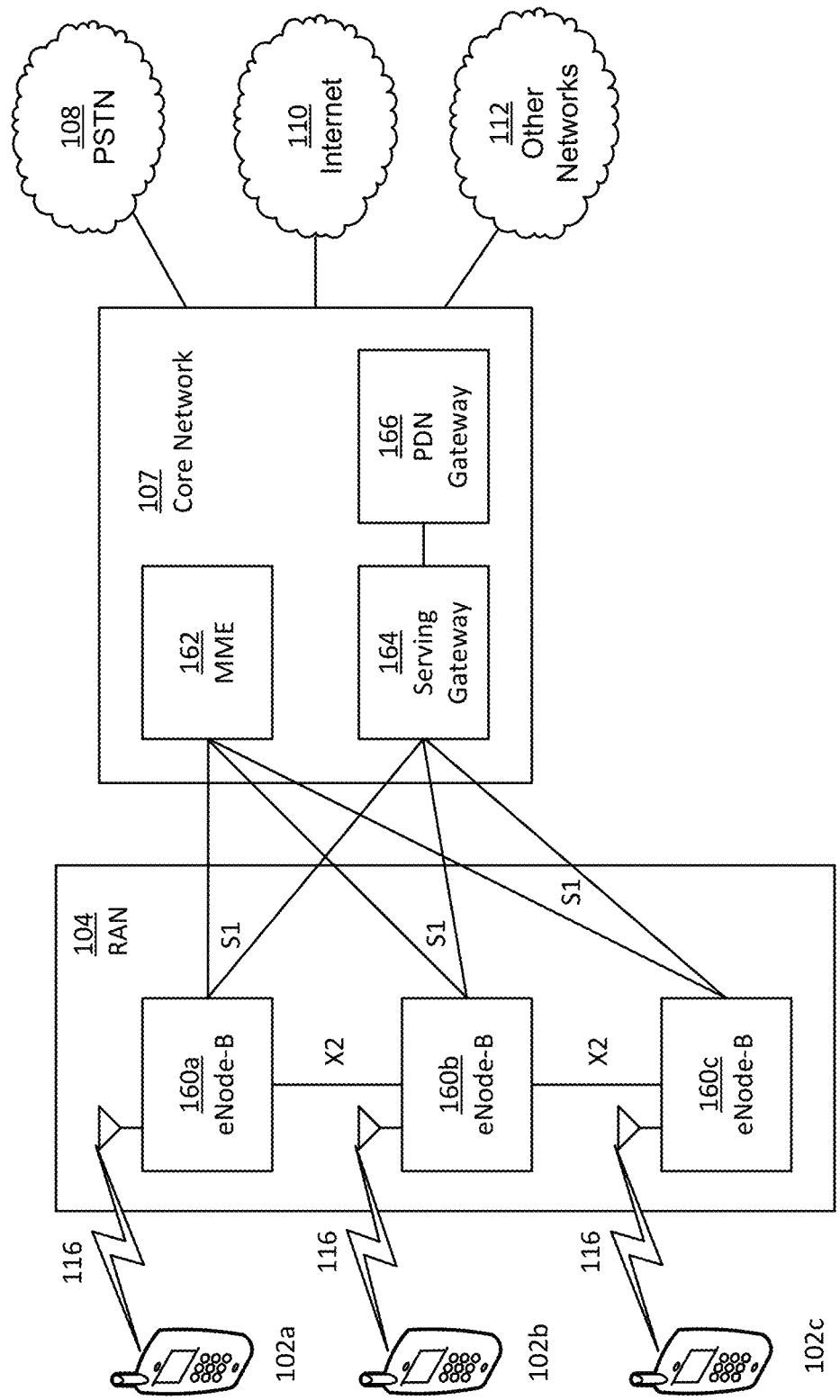
FIG. 13H is a system diagram of the RAN and the core network according to another embodiment.

FIG. 13H is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 13H, the eNode-Bs 160a, 160b, 160c may communicate with one another over an X2 interface.

The core network 107 shown in FIG. 13H may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 13I:
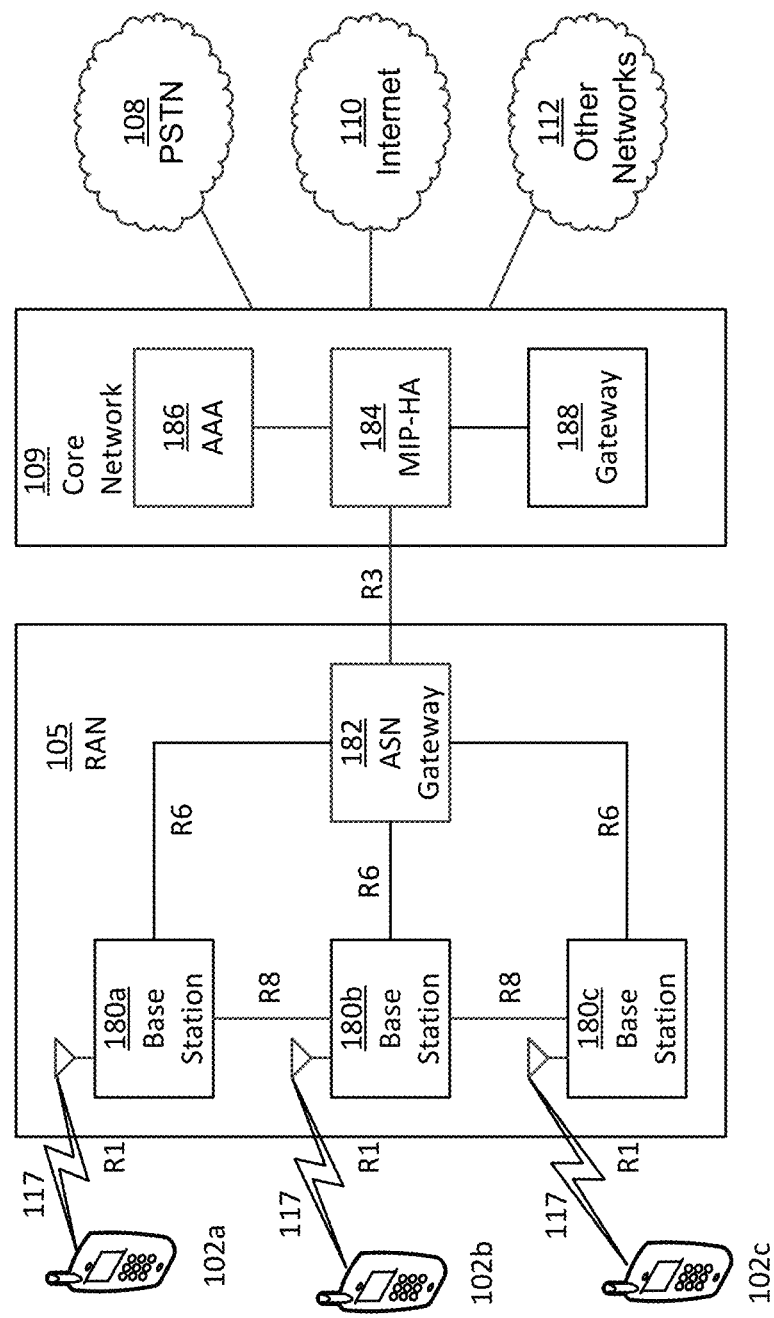
FIG. 13I is a system diagram of the RAN and the core network according to yet another embodiment.

FIG. 13I is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 13I, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 13I, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 13I, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 13E, 13G, 13H, and 13I are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 13E, 13F, 13G, 13H, and 13I are provided by way of example only, and it is understood that the subject matter disclosed and claimed herein may be embodied or implemented in any similar communication system, whether presently defined or defined in the future.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

Assisting SCS/AS in Selecting the Best Server

As described above, future services, such as for example, augmented reality services, will have critical requirements on transfer bandwidth and delay. In many cases, the same service will be available through multiple servers (for example SCSs/ASs). In order for the services to meet the stringent requirements, the end user (or UE) will typically have to communicate with the closest of these multiple servers.

According to an aspect of the application, the SCS/AS may decide that a UE should be served by an alternate server. The SCS/AS may base its decision on awareness of the alternate servers (location, load, etc.) as well as information that is or may only be known to the core network. This information may include UE location, UE sleep state, CNTP locations, UE mobility and CNTP load. Each of these will be discussed in turn.

In regards to UE location, the SCS/AS may want the UE served by a server that is geographically closer. Although some UEs will have the capability to provide location information directly to the SCS/ASs, this will not be possible for all UEs. For instance some UEs may be indoors, some may be memory constrained, and others may be power constrained. For such devices, the network may be in the best position to provide location information to the SCS/AS.

In regards to UE sleep state, the SCS/AS may decide to only change the server if the UE is active. For instance, if a UE has long sleep periods, it may not be beneficial to move to an alternate server.

In regards to CNTP locations, the SCS/AS may want the UE served by a server that is geographically closer to the CNTP. In regards to UE mobility, the SCS/AS may decide to change the server if the UE has low mobility. It may not wish to ping pong between servers if the UE is fast moving. In regards to CNTP load, the SCS/AS may want the UE served by a server that is geographically closer to a CNTP that is lightly loaded.

Figure 14:
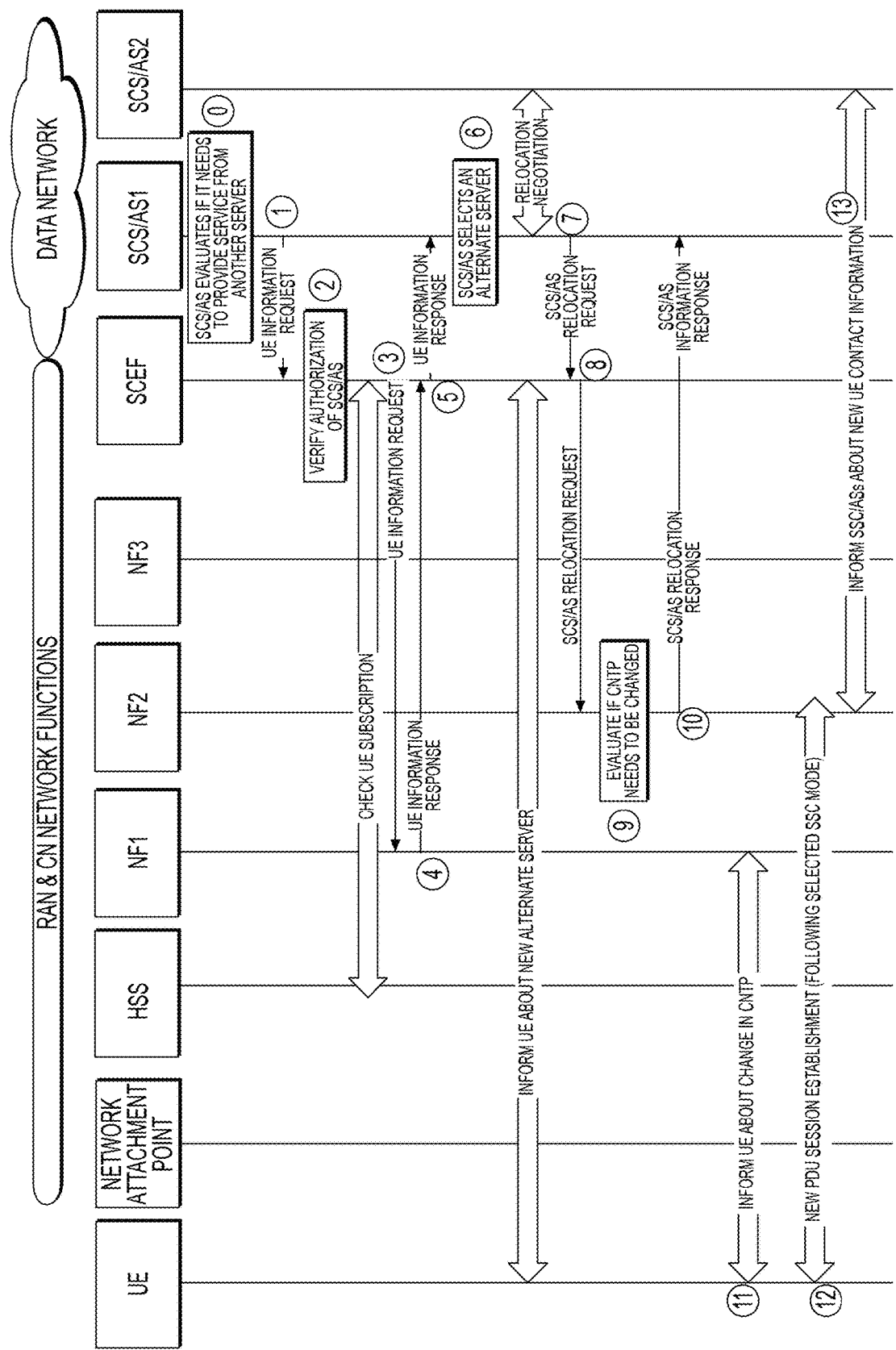
FIG. 14 illustrates an embodiment of the application directed to assisting a service capability server/application server in selecting the best server.

In an embodiment as illustrated in FIG. 14, the SCS/AS may query the core network. It is envisaged that some functionality described in the call flow is assigned to generic network functions labelled NF1, NF2, and NF3 in FIG. 14. Namely NF1 is responsible for tracking Location and Sleep-State for the UE. It should be appreciated that, since NF1 manages mobility of a UE, it may also be called an Access and Mobility Management Function (AMF);

NF2 is responsible for CNTP selection. It should be appreciated that, that NF2 may either select the UPF that will become the PDU session anchor mobility, or it may generate/update may generate/update policy rules that result in the UPF becoming the PDU session anchor. In the former, NF2 may also be called a Session Management Function (SMF), while in the latter, NF2 may also be called a Policy Control Function (PCF);

NF3 is responsible for PDU session establishment. It should be appreciated that, since NF3 establishes the PDU session it may also be called a Session Management Function (SMF) and may be incorporated with NF2.

It is understood that these network function are only for illustrative purposes and that the described functionality may be split across fewer or more network functions. In FIG. 14, each of the steps is denoted by a number encapsulated in a circle.

In Step 0, a third party server (SCS or AS) may decide to evaluate if a better alternate server is available. In one embodiment, this may be a result of some trigger condition. The trigger condition may include but is not limited to load on the current server, availability of a new alternate server, and a policy (e.g., based on time of day). In another embodiment, it may be periodic (e.g., for example every 2 hours).

In Step 1, the third party SCS/AS sends a UE Information Request message to the SCEF. The message may include information including but not limited to SCS/AS Identifier, SCS/AS Reference ID, UE External Identifier or MSISDN, Location Flag, SleepState Flag, CNTP Flag, Mobility Flag, and CNTP Load Flag. The SCS/AS Identifier identifies the SCS/AS that is initiating the request. The SCS/AS Reference ID is a transaction ID that is assigned by the SCS/AS. The UE External Identifier identifies the UE for which the request is made. The Location Flag, if set, informs the core network that the SCS/AS would like location information about the UE. The SleepState Flag, if set, informs the core network that the SCS/AS would like sleep state information about the UE. The CNTP Flag, if set, informs the core network that the SCS/AS would like CNTP location information for this UE. The Mobility Flag, if set, informs the core network that the SCS/AS would like mobility information about the UE. The CNTP Load Flag, if set, informs the core network that the SCS/AS would like information about the load of the CNTP serving this UE.

Alternatively, the SCS/AS can configure a monitoring event at the network function keeping track of location and UE sleep state (e.g., MME). Upon a change in location or sleep state, the network function may send a report to the SCS/AS, through the SCEF.

In Step 2, the SCEF checks whether the SCS/AS is authorized to receive UE information. This may involve an interaction with the HSS, UDR, a subscriber data base, or a AAA server NF to check UE subscription information. The AAA server NF is responsible for authentication and may also be called the Authentication Server Function (AUSF). The SCEF stores SCS/AS Identifier, and SCS/AS Reference ID. The SCEF assigns an SCEF Reference ID.

In Step 3, the SCEF sends a UE Information Request message to the network function responsible for tracking Location and SleepState for the UE. This is illustrated as NF1 in FIG. 14. Moreover, the message may include information including but not limited to External Identifier or MSISDN, SCEF Reference ID, SCEF Address, Location Flag, SleepStateFlag, CNTP Flag, Mobility Flag, and CNTP Load Flag). In an embodiment, the SCS/AS Reference ID is a transaction ID that is assigned by the SCEF. For example, this network function may be the MME or a MM NF.

According to Step 4, the Network Function (NF1) responds with a UE Information Response. The response may include information including but not limited to SCEF Reference ID, Location, SleepState, CNTP location, Mobility Flag, and a CNTP Load Flag. The Location includes location information for the UE, such as for example, approximate GPS coordinates or other geographical information. The SleepState includes current sleep state of UE. This may include for example, an eDRX or PSM. The CNTP location includes the location of the CNTP serving this UE. The Mobility includes an indication of the speed of the UE. The speed may be selected from fast, slow, and stationary. Further, the CNTP load includes an indication of the relative load of the CNTP currently serving the UE. For example, this may be a relative measure such as high or low.

In Step 5, the SCEF uses the SCEF Reference ID to cross-reference the response to the initial request. The SCEF forwards the information to the SCS/AS using the UE Information Response message. This includes a SCS/AS Reference ID, Location, SleepState, and CNTP location.

Next in Step 6, the SCS/AS selects an alternate server. Namely, it negotiates the relocation with the alternate server, and it informs the UE that it is to use the alternate server. Thereafter, the SCS/AS notifies the core network that a new alternate server will be used (Step 7). This may be performed via a SCS/AS Relocation Request sent to the SCEF. The request may include a SCS/AS Identifier, SCS/AS Reference ID, UE External Identifier or MSISDN, new SCS/AS identifier, and a new SCS/AS location).

Then, in Step 8, the SCEF sends a SCS/AS Relocation Request message to the network function responsible for CNTP selection. The message may include an (i) an External Identifier, MSISDN or IMSI, (ii) SCEF Reference ID, (iii) SCEF Address, (iv) new SCS/AS identifier, and (v) new SCS/AS location. The network function may be the MME, MM NF, SM NF, or the policy control NF. The SCS/AS may provide additional information to the core network so that it can better evaluate the need to change to the CNTP. This is exemplary shown as network function NF2 in FIG. 14. Here, the SCEF may be provisioned to know the CNTP that is closest to the new SCS/AS. This request may indicate that the SCEF desires to move the UE's CNTP to the CNTP that is closest to the SCS/AS. Since the UE may have many active sessions, this request may relate to just a single session. Accordingly, the request may carry a set of source and destination IP addresses and port numbers that describe the session. Further, the SCS/AS may provide additional information to the core network so that it can better evaluate the need to change the CNTP.

In Step 9, Network function NF2 evaluates if there is a need to change the CNTP to maintain an efficient user plane path. Here it is assumed that the core network advises the UE to start a new PDU session to the new CNTP. Alternatively, NF2 can arrange for the transfer of context between the old CNTP and the new CNTP. For example NF2 can obtain the PDU session information from the old CNTP and pre-establish a new PDU session for the UE at the new CNTP. In so doing, NF2 may receive the new UE contact information from the new CNTP and provide this directly to the UE.

Network function NF2 acknowledges the change in SCS/AS via a SCS/AS Relocation Response (Step 10). If the network function accepts the request to change the CNTP, network function NF2 informs the UE that its CNTP needs to change. A SM or MM message may be sent to the UE indicating the new CNTP and describing or identifying the session that is changing (Step 11). Here it is assumed that the core network advises the UE to start a new PDU session to the new CNTP.

Next, in Step 12, upon reception of this message, the UE will follow the procedure for the selected SSC Mode. For instance for SSC Mode 3, the UE may start a new PDU session to the new CNTP. The message may be sent to the network function responsible for starting the PDU session. This is shown as NF3 in the FIG. 14. NF3 may be MM NF or a SM NF. Finally, the core network informs all impacted SCS/ASs that the UE contact information has changed (Step 13).

Assisting Core Network in Selecting Most Efficient User Plane Path

According to another aspect, a UE may have multiple application flows destined to different SCSs/ASs within the data network. Each of these flows will belong to a single PDU session that terminates in the core network at a CNTP. The core network may decide to change the CNTP for the PDU session to meet requirements for some of the flows with the PDU session.

As the PDU session may have multiple application flows, the core network needs information on each of the application flows in order to evaluate if the CNTP should be changed. TABLE 2 shows the information that may be provided to the core network to evaluate if the CNTP should be changed.

TABLE 2

| Input | Description |
|---|---|
| Application Flow ID | An identifier that uniquely identifies the application flow in this PDU session. The Application Flow ID may identify a source and destination IP address and port number combination, or a non-IP PDU session that terminates at a particular NF, AS, or SMS-SC. |
| Data rate | Average data throughput for application flow (e.g., in bps or packets/sec). |
| Data Volume | Volume of traffic to be carried on the application flow (e.g., in bytes). This may also be a descriptive field such as: small data, large, etc.). |
| Priority | The priority of the data traffic. This may be a numeric value. For instance a number between 0 and 10 with 10 having the highest priority. Alternatively this may also be a relative priority: low, medium, high. |
| Latency requirement | The latency requirement for the application flow. For instance the application flow may have a delay requirement of K sec. |
| Observed Delay | The observed delay for the application flow. This may be a numeric value of a relative indication if the flow meets the requirement (yes/no). |
| Communication pattern | The communication pattern associated with the application flow. For example once every 2 hrs. |
| List of potential Alternate server locations | The location of the potential alternate servers. |
| List of potential Alternate server loads | The load experienced by the potential alternate servers. |
| Willingness to allow CNTP change triggered by another application flow | The ASs may not want to move certain application flows. For instance, the application flow may set this to: "allowed", "not allowed". A setting of "allowed" implies that the AS allows the NextGen system to move the application flow to a new PDU session. A setting of "not allowed" implies that the AS would prefer that the NextGen system maintain these flows in the current PDU session. |

It is envisaged that the entries in this table may be split between uplink (UE to SCS/AS) and downlink (SCS/AS to UE).

The SCS/AS may use the SCEF to provide the above information to the network function responsible for CNTP selection (for example, the MME, MM NF, or SM NF). The SCS/AS may provide this information once the application flow is established and periodically thereafter. Alternatively, the SCS/AS may signal the core network when one of the requirements is not being met. For example, the SCS/AS may ask the core network to evaluate changing the CNTP or the indication from the SCS/AS that the requirements are not being met may trigger the core network to evaluate changing the CNTP. This may be as a result of an application flow not meeting the latency requirement or the SCS/AS selecting an alternate server.

Figure 15:
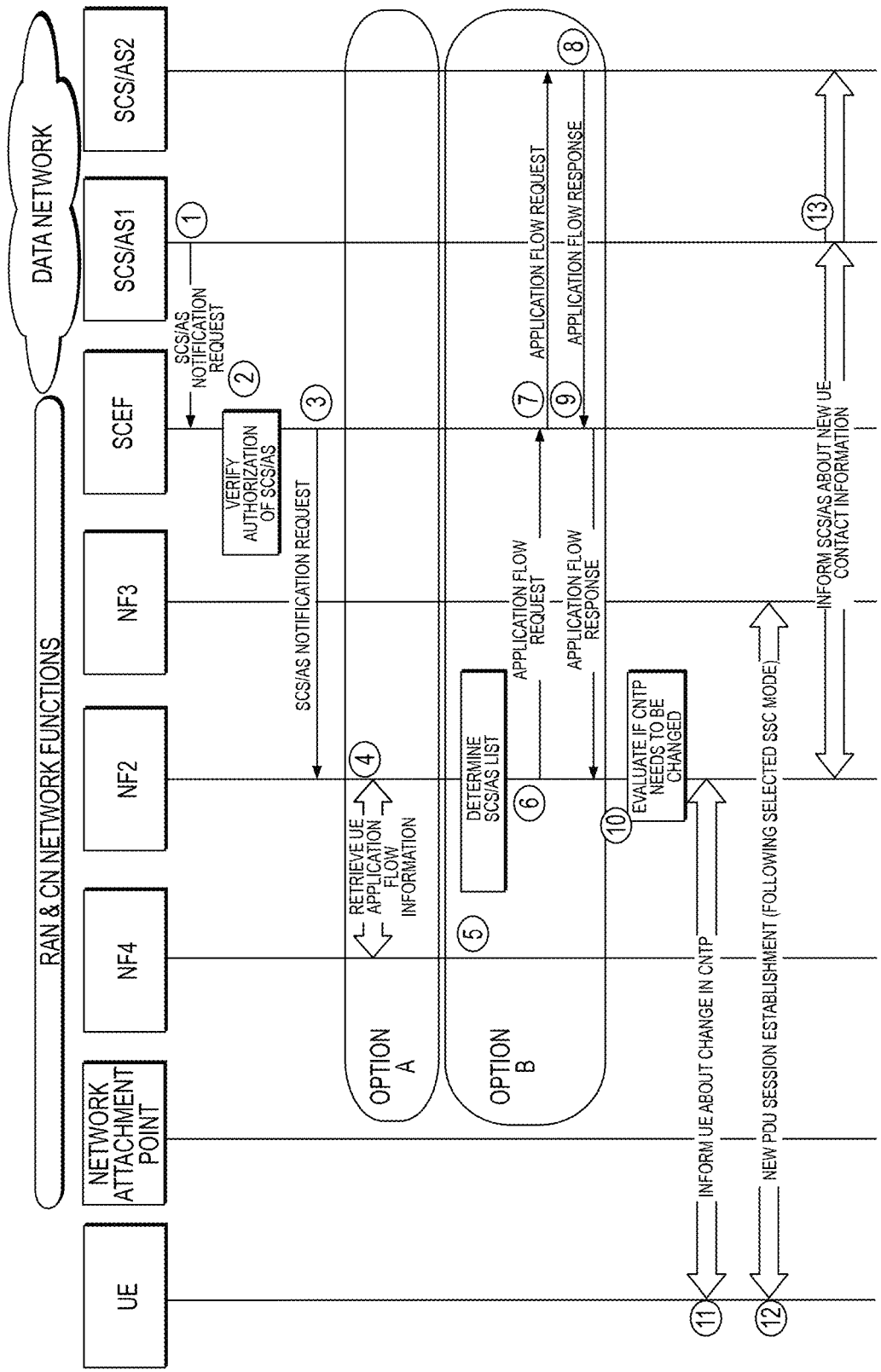
FIG. 15 illustrates an embodiment of the application directed to assisting the core network in selecting the most efficient user plane path.

The core network may then evaluate if a change in CNTP is warranted, by determining the characteristics of the other application flows sharing the same PDU session for the UE. An embodiment of this aspect as exemplarily shown in FIG. 15. In FIG. 15, each of the steps is denoted by a number encapsulated in a circle. It is noted that some of functionality described in the call flow is assigned to generic network functions (labelled NF2, NF3, and NF4).

Namely, NF2 is responsible for CNTP selection. It should be appreciated that, that NF2 may either select the UPF that will become the PDU session anchor mobility, or it may generate/update policy rules that result in the UPF becoming the PDU session anchor. In the former, NF2 may also be called a Session Management Function (SMF), while in the latter, NF2 may also be called a Policy Control Function (PCF);

NF3 is responsible for PDU session establishment. It should be appreciated that, since NF3 establishes the PDU session it may also be called a Session Management Function (SMF) and may be incorporated with NF2.

NF4 is responsible for storing the application flow information for the PDU sessions. It should be appreciated that, since NF4 stores UE flow information it may also be called a Unified Data Management (UDM) or Data Storage Network Function (DSF).

It should be understood that this is for illustrative purposes and that the described functionality may be split across fewer or more network functions.

In an embodiment, a third party SCS/AS initially sends a SCS/AS Notification Request message to the SCEF (Step 1). The SCS/AS Notification Request message may include and is not limited to a SCS/AS Identifier, SCS/AS Reference ID, UE External Identifier or MSISDN, UL Flow Characteristic, and DL Flow Characteristic. In particular, the SCS/AS Identifier identifies the SCS/AS that is initiating the request. The SCS/AS Reference ID is a transaction ID that is assigned by the SCS/AS. The UE External Identifier identifies the UE for which the request is made.

The UL Flow Characteristic provides information regarding the application flow to this SCS/AS. This is shown in TABLE 2. Moreover, the DL Flow Characteristic provides information regarding the application flow from this SCS/AS. The parameters are defined in TABLE 2.

In Step 2, the SCEF checks if the SCS/AS is authorized to send Notification requests. The SCEF stores SCS/AS Identifier, and SCS/AS Reference ID. The SCEF assigns an SCEF Reference ID. Then, the SCEF sends an SCS/AS Notification request (External Identifier or MSISDN, SCEF Reference ID, SCEF Address, UL Flow Characteristic, DL Flow Characteristic) message to the network function responsible for evaluating whether CNTP needs to be changed (Step 3). This is shown as NF2 in FIG. 15. In an embodiment, the SCS/AS Reference ID is a transaction ID that is assigned by the SCEF. In an exemplary embodiment, this network function may be the MME, PCF or SMF.

As depicted in FIG. 15 as "Option A," if the core network stores application flow information (see TABLE 2) for all flows of a PDU session, the network function may retrieve this information (Step 4). For example, the call flow shows that this information is stored in network function (NF4). For instance, NF4 may be an HSS, MME, MM NF, SM NF, CNTP, UDM, or DSF. Step 10 subsequently follows Step 4.

On the other hand, "Option B" describes an embodiment where the core network is unaware of the application flow information (Step 5). If so, the network function NF2 needs to retrieve this information prior to making its decision. NF2 may first determine the SCS/AS communicating with the UE. This will be described in more detail below.

Once NF2 has a list of SCS/AS impacting this PDU session, it may individually query each of these to determine the application flow information for each of these (Step 6). In an embodiment, NF2 may send an Application Flow Request to the SCEF. The Application Flow Request may include but is not limited to NF2 Reference ID, UE External Identifier, SCS/AS Destination Address, UL Flow, and DL Flow. In an embodiment, the NF2 Reference ID denotes a transaction ID to cross-reference response received by NF2. The UE External Identifier identifies the UE for which the request is made. The SCS/AS Destination Address denotes the address of the SCS/AS. The UL Flow describes an optional flag to notify the SCS/AS that NF2 is interested in UL flow characteristic information. Further, DL Flow is an optional flag to notify the SCS/AS that NF2 is interested in DL flow characteristic information.

According to Step 7, the SCEF stores the NF2 Reference ID and assigns a SCEF Reference ID. The SCEF then sends an Application Flow Request, including but not limited to the SCEF Reference ID, UE External Identifier, UL Flow and DL Flow, to the SCS/AS Destination Address.

Thereafter, the SCS/AS sends an Application Flow Response message to the SCEF (Step 8). In particular, the Application Flow Response message includes but is not limited to a SCEF Reference ID, UE External Identifier or MSISDN, UL Flow Characteristic, and DL Flow Characteristic. Next, the SCEF cross-references the SCEF Reference ID to determine the related NF2 Reference ID and sends an Application Flow Response message to NF2. The message includes NF2 Reference ID, a UL Flow Characteristic, and a DL Flow Characteristic).

In Step 10, the Network Function NF2 evaluates whether the CNTP needs to be changed. NF2 will take into account if the application flow allows changing PDU session. For example based on the input from the AS. It may only change PDU session for the application flows that allow it. Alternatively it may decide to change the PDU sessions even for those application flows that have specified that they do "not allow" CNTP change. If the network function accepts the request to change the CNTP, network function NF2 informs the UE that its CNTP needs to change (Step 11). A SM or MM message may be sent to the UE indicating the new CNTP. The message may describe or identify the session that is changing as well as list of application flows that are moving to the new PDU session.

In an alternative embodiment to Steps 10 and 11 (e.g., assumed the core network advises the UE to start a new PDU session to the new CNTP), NF2 can arrange the transfer of context between the old CNTP and the new CNTP. For example, NF2 can obtain the PDU session information from the old CNTP or DSF and pre-establish a new PDU session for the UE at the new CNTP. As a result, NF2 may receive the new UE contact information from the new CNTP and provide this directly to the UE.

Next in Step 12, upon reception of the message in Step 11, the UE will follow the above-mentioned procedure for selecting a SSC Mode. For instance for SSC Mode 3, the UE may start a new PDU session to the new CNTP. The message may be sent to the network function responsible for starting the PDU session. This is exemplary shown as NF3 in FIG. 15. NF3 may be MM NF or an SM NF. Lastly, the core network informs all impacted SCS/ASs that the UE contact information has changed.

Informing SCS/AS about a Change in UE Contact Information

According to yet another aspect of the application, when the UE contact information of a UE is changed, e.g., change in its CNTP, the UE should be informed. In so doing, the UE may update all mobile originated traffic. In addition, all SCS/ASs that the UE is communicating with also need to be informed. This ensures the SCS/ASs send mobile terminated traffic to the UE. In some cases, this is handled through application protocols running in both the UE (client) and the SCS/ASs (servers). One such application protocol is SIP. The SIP protocol may not be suitable for constrained UEs. Rather, the core network may be in a better position to inform the SCS/ASs about a change in UE contact information.

As will be described below in more detail, three embodiments of this procedure are envisaged. In one embodiment, the core network is very proactive. That is, as soon as a change in UE contact information is detected, the core network will notify all necessary SCS/ASs. Another embodiment is more reactive. Namely it only updates SCS/AS when they send Mobile Terminated (MT) traffic to the UE. The third embodiment is an on-demand approach. Here, the SCS/AS queries the core network before sending any mobile terminated traffic.

Figure 16:
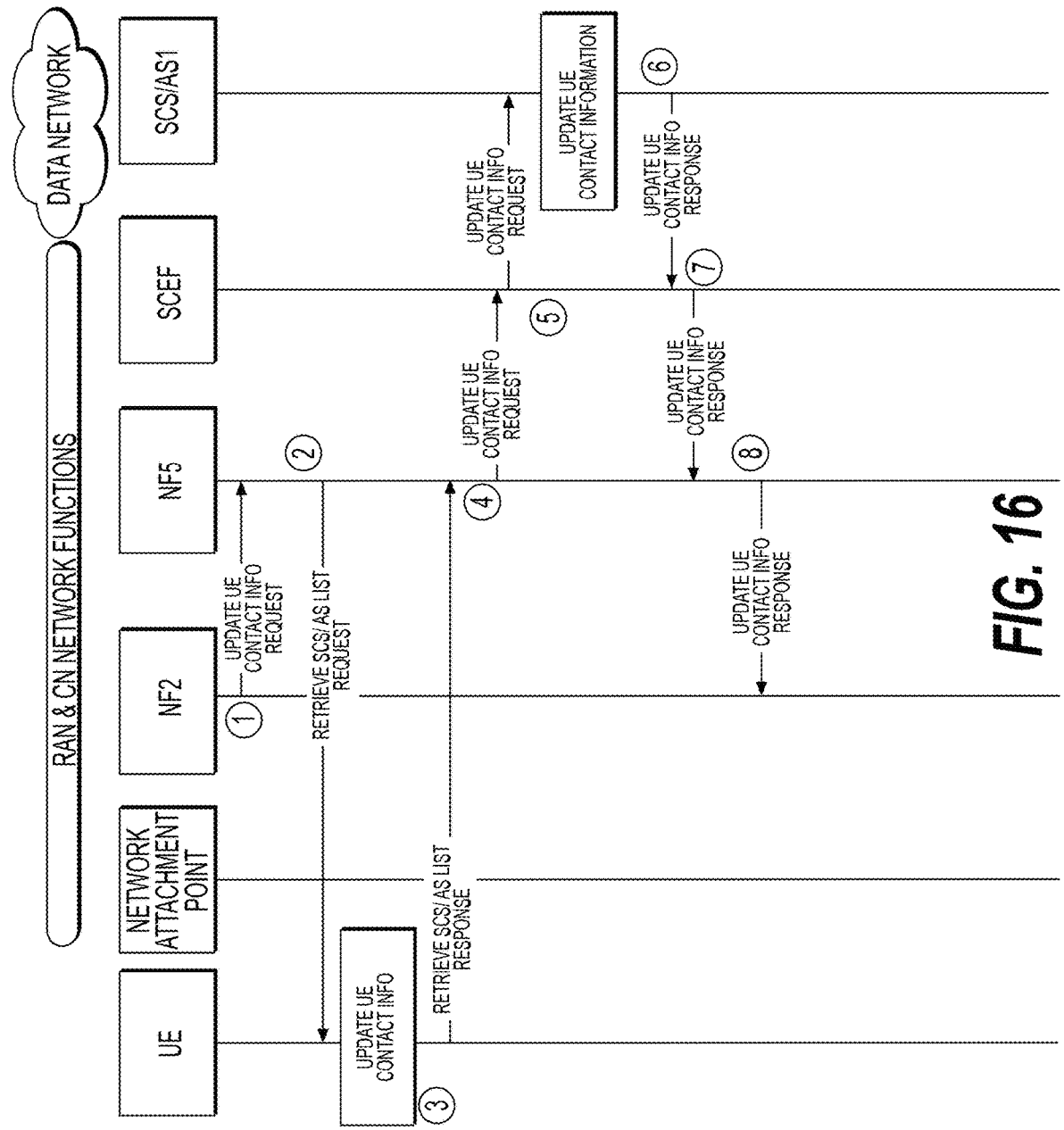
FIG. 16 illustrates an embodiment of the application directed to proactively notifying the service capability server/application server about a change in address.

The technique for the proactive approach is exemplarily described in an embodiment as illustrated FIG. 16. Some of the functionality described in the call flow is assigned to generic network functions (e.g., NF2 and NF5 in FIG. 16). In FIG. 16, each of the steps is denoted by a number encapsulated in a circle.

Namely NF2 is responsible for CNTP selection. It should be appreciated that, that NF2 may either select the UPF that will become the PDU session anchor mobility, or it may generate/update policy rules that result in the UPF becoming the PDU session anchor. In the former, NF2 may also be called a Session Management Function (SMF), while in the latter, NF2 may also be called a Policy Control Function (PCF); and NF5 is responsible for updating UE contact information at the SCS/ASs. It should be appreciated that NF5 may communicate to the SCS/AS directly or via the SCEF. As NF5 sends notifications to the SCS/AS, it may also be called the DSF.

It is envisaged that the described functionality may be split across fewer or more network functions.

According to Step 0 in FIG. 16, it is assumed that network function NF2 has decided to change the CNTP serving a UE. This decision may be caused by events described in Step 9 of FIG. 14 and/or Step 10 of FIG. 15 above. In Step 0, the UE is requested to start a PDU session with the new CNTP. This results in a change in the UE contact information. However, the UE maintains its PDU session with the old CNTP during a transition period.

In Step 1, Network Function NF2 notifies the network function responsible for updating the UE contact information at the SCS/ASs (e.g., NF5). NF2 sends an Updated UE Contact Info Request to NF5. This Request may include and is not limited to NF2 Reference ID, UE External ID, old CNTP address/identifier, old UE contact Information, new CNTP address/identifier, and new UE contact information.

In Step 2, Network Function NF5 may be aware of the application flows tied to UE. Alternatively, it may be able to retrieve this information. However, NF5 may not be aware of the SCS/ASs that these application flows are destined for. NF5 determines these application flows by querying the UE. In particular, NF5 sends a Retrieve SCS/AS List Request (e.g., NF5 Reference ID, UE External ID, old UE contact Information, old CNTP address/identifier, new UE contact information, and new CNTP address/identifier) to the UE. This request may be sent through a SM or MM message.

An alternative embodiment for Step 2 to querying the UE to find all of the SCS/ASs is to have the core network keep track of this information in a Destination SCS/AS table. This may be stored, for example, in a network function, e.g., NF6—for example a DSF. Every time an application flow is started, NF6 is informed and it updates the Destination SCS/AS table with the UE External ID and the SCS/AS destination address. The latter can be found either through explicit signaling by the UE or through Deep Packet Inspection (DPI) techniques applied within the core network. Each time an application flow is terminated, NF6 is informed and the entry is removed from the Destination SCS/AS table.

Next, UE updates its own UE contact information (Step 3) as necessary. In addition, UE prepares a list of SCS/ASs which it communicating with via the old CNTP. UE1 sends the list to NF5 through a Retrieve SCS/AS List Response (e.g., NF5 Reference ID, UE External ID, and SCS/AS Address list). For each entry in the list, UE may include the application flow identifier as well as measured properties of the application flow. These measured properties include but are not limited to the observed latency for this application flow, the average throughput over the application flow, average size of transmission over the flow, and the activity or communication pattern on the application flow (e.g., once every hour).

The UE has a number of alternatives to process the request. In an embodiment, each individual application may manage the request and generate the appropriate method call to respond. In another embodiment, the request may be handled by one of the 3GPP protocol layers (e.g., the PDCP, RLC, RRC, and NAS) within the UE. For example, the UE PDCP layer may keep track of the radio bearers that it has active and the destination IP address/port associated with these radio bearers. It may then map the Destination IP address to SCS/AS address and Radio bearer to application flow. In yet another embodiment, the 3GPP protocol layers may perform packet inspection to handle the request and generate a response.

According to Step 4, NF5 contacts each of the SCS/ASs in turn to notify them of the change in UE contact information. NF5 sends an Update UE Contact Info Request to the SCEF. The Request may include but is not limited to information such as NF5 Reference ID, UE External ID, SCS/AS Address, Application Flow identifier, old UE contact information, and new UE contact information.

In an alternative embodiment for Step 4, NF5 may filter out application flows that are destined to the same SCS/AS. For instance, if a UE has two application flows (application Flow identifier=11 and Application Flow Identifier=14) both communicating to the same SCS/AS, NF5 may combine the two flows and send a single Update UE Contact Info Request.

In yet another alternative embodiment to Steps 2-4, existing functionality may be relied upon to have the SCS/AS set up a monitoring event(s) in the core network. This may be at the CNTP serving the UE. In particular, the SCS/AS may define a new monitoring event including a change in UE contact information. Every time there is a change in the UE contact information, due to a change in the CNTP, the CNTP sends a monitoring event report to the SCS/AS through the SCEF.

Subsequent to Steps 2-4, the SCEF forwards the Update UE Contact Info Request to the SCS/AS (Step 5). In particular, the request includes but is not limited to information such as SCEF Reference ID, UE External ID, Application Flow identifier, old UE contact information, and new UE contact information. In Step 6, the SCS/AS updates the UE contact information for UE, and acknowledges SCEF with an Update UE Contact Info Response message. The message may include information including but not limited to SCEF Reference ID and cause. Next, the SCEF forwards the acknowledgement Update UE Contact Info Response message to network function NF2 (Step 7). Lastly, upon updating all SCS/ASs, NF5 acknowledges to NF2 that all SCS/ASs have been updated with an Update UE Contact Info Response message (Step 8).

Reactive Approach

Figure 17:
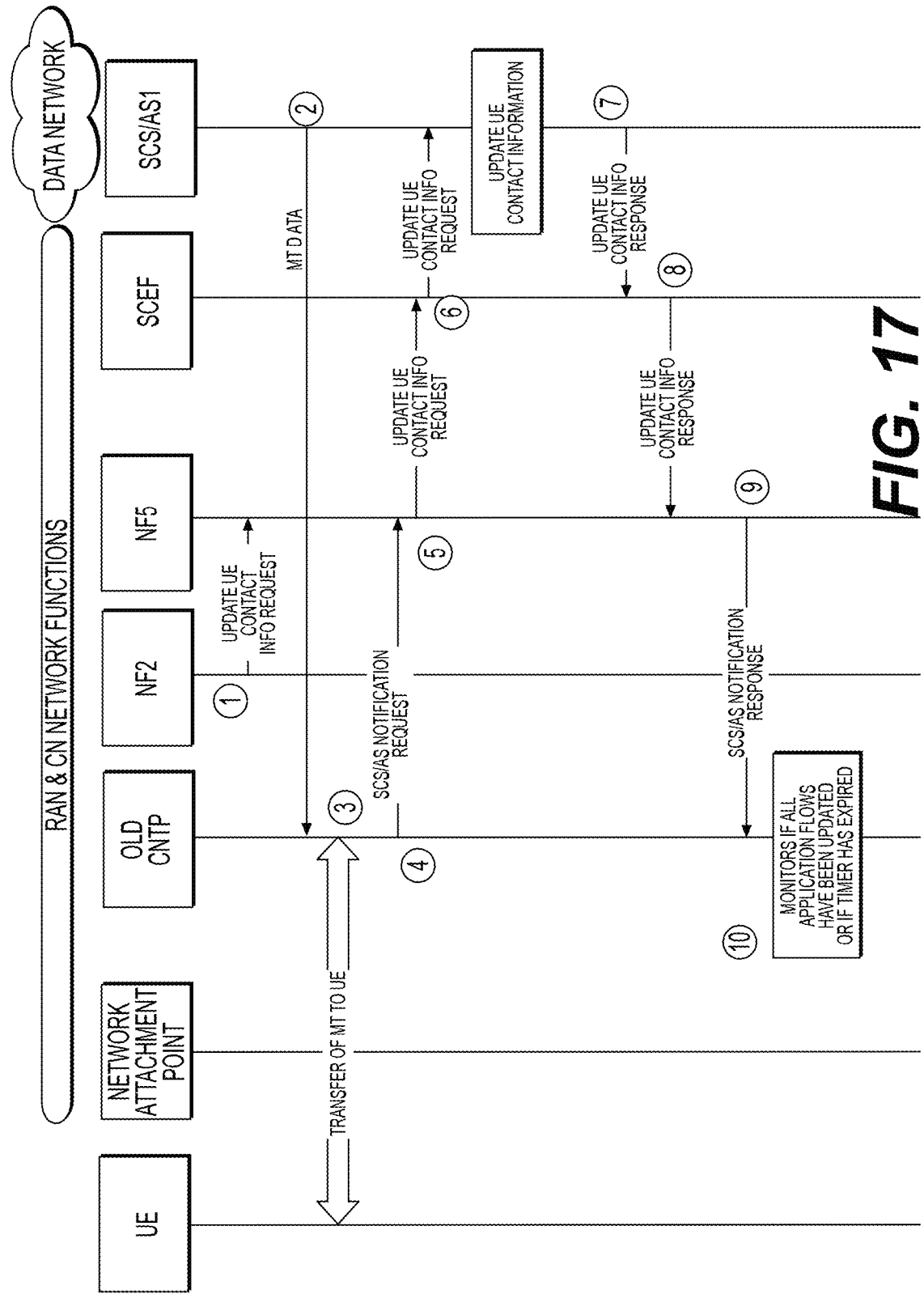
FIG. 17 illustrates an embodiment of the application directed to reactively notifying the service capability server/application server about a change in address.

In yet another aspect of this application, the core network does not inform the SCS/AS immediately upon every change in UE contact information. Rather, this embodiment relies on the core network maintaining the old PDU session and UE contact information. The mobile terminated traffic to this old UE contact information is used as a trigger to update the UE contact information. This is exemplary shown in FIG. 17. In FIG. 17, each of the steps is denoted by a number encapsulated in a circle. Some of the functionality described in the call flow is assigned to generic network functions labelled as NF5. Namely NF5 is responsible for updating UE contact information at the SCS/ASs. It is envisaged that the above-described functionality may be split across fewer or more network functions.

In Step 0, the core network has already decided to change the CNTP for a UE. However, it continues to maintain the context at the old CNTP until all the application flows have been successfully transferred to the new CNTP or a timer expires. The old CNTP is also told to monitor for mobile terminated traffic destined for this UE.

In Step 1, Network Function NF2 notifies the network function responsible for updating the UE contact information at the SCS/ASs. This is shown as NF3 in FIG. 17. NF2 sends an Update UE Contact Info Request to NF5. The request has information including but not limited to NF2 Reference ID, UE External ID, old CNTP address/identifier, old UE contact Information, new CNTP address/identifier, and new UE contact information.

In Step 2, the SCS/AS is unaware that the UE has changed its UE contact information. SCS/AS continues to send mobile terminated data to the old CNTP. In Step 3, old CNTP will transfer the data to the UE. The UE may have 2 PDU sessions concurrently running to the same data network. The Old CNTP may change the destination IP address or session IP address to the new IP address.

In Step 3, old CNTP is monitoring traffic for this UE. When it receives mobile terminated traffic on one of the flows to the UE, it uses this as a trigger to update the UE contact information at the SCS/AS that sent the mobile terminated data. Old CNTP sends a SCS/AS Notification Request to the responsible network function, e.g., NF5, with the address of the SCS/AS that needs to be updated and the UE External ID. It is envisaged that the other flows in the PDU session will be updated.

Next in Steps 5 and 6, NF5 sends the Update UE Contact Info Request to the SCS/AS through the SCEF. In Steps 7 and 8, the SCS/AS updates the UE contact information and acknowledges network function NF5. In Step 9, the NF5 acknowledges to the old CNTP that the SCS/AS has been updated. As shown in Step 10, old CNTP keeps track of all the application flows that have been updated. The old CNTP may remove all UE related context if all have been updated or if a timer has expired.

On-Demand Approach

In yet even another aspect of the application, all mobile terminated communication is preceded by an address discovery process. This is referred to as an on-demand approach. More specifically, the SCS/AS knows that the UE is reachable through the mobile network but doesn't know its UE contact information, e.g., IP address. Therefore, it gives the mobile network the UE external ID. In return, the network provides it with the current UE contact information.

In an embodiment, the SCS/AS needing to send traffic to a UE queries the core network to find the latest UE contact information for that UE. Subsequently, the SCS/AS uses this latest UE contact information to send the mobile terminated traffic.

Hybrid Approach

In yet a further aspect, two or more of the above-mentioned approaches may be combined. In other words the core network may use a combined reactive and proactive approach. The network function responsible for updating the SCS/ASs may obtain the list of SCS/ASs to update. However, it may only contact certain SCS/ASs on the list which have not initiated any mobile terminated traffic for a pre-defined period.

NF5 may also employ timers. If after establishment of a new CNTP (in reactive mode), if a SCS/AS does not initiate mobile terminated traffic after a predetermined period, NF5 will initiate the update only with the "lagging" SCS/AS. This ensures that there are no "leftover" flows being maintained at the old CNTP for a long time while most have been updated.

In yet even another embodiment, the SCS/AS list may have indicators to tell NF5 how each flow should be handled. That is, whether to be proactive, reactive, and/or on-demand. Alternatively, this may be deduced based upon the characteristic of the flow (e.g., amount of traffic on flow, frequency of traffic on flow, etc.)

Graphical User Interface

Figure 18:
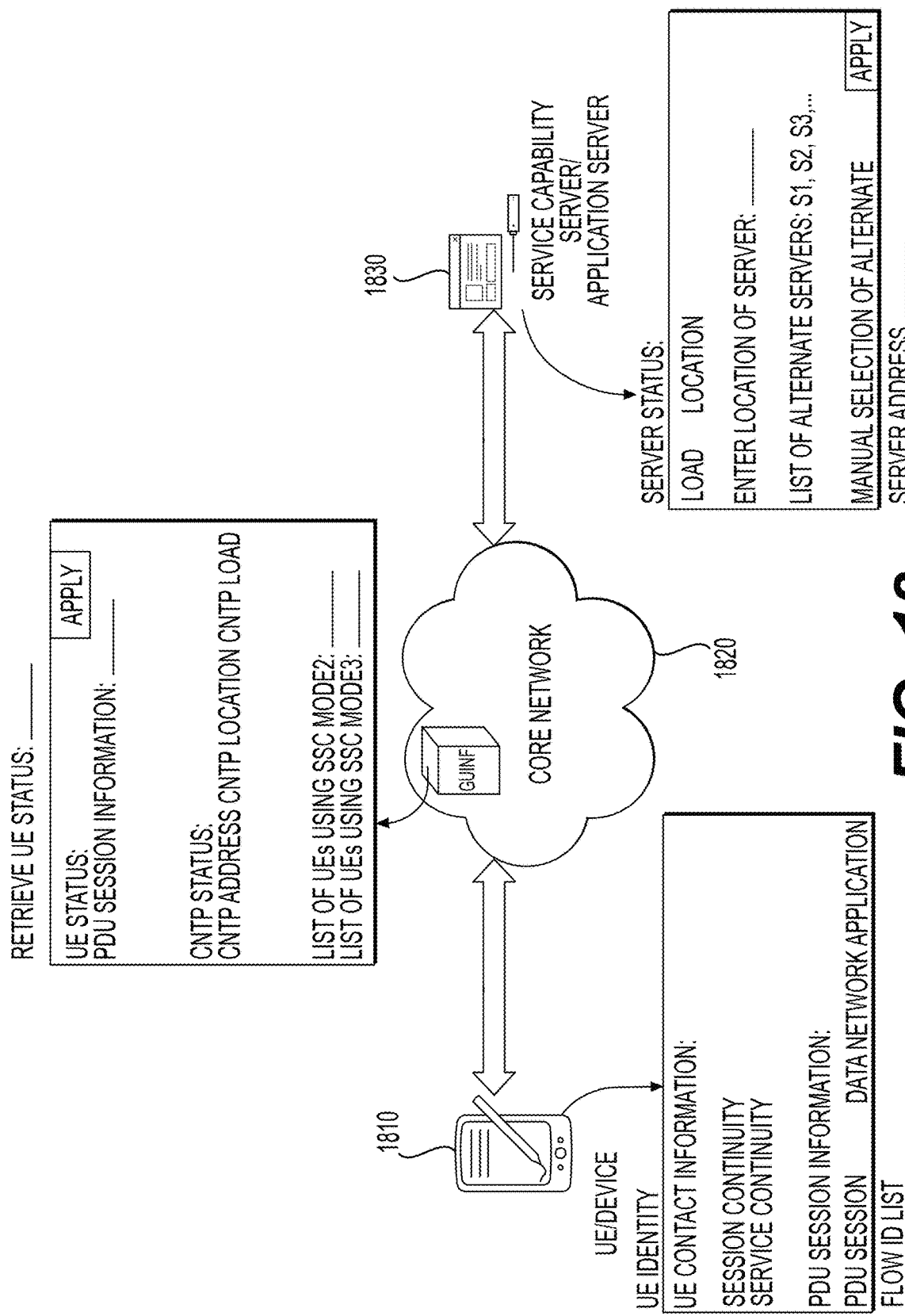
FIG. 18 illustrates an embodiment of the application direct to a graphical user interface of user equipment, the core network and a service capability server/application server.

According to an embodiment, a graphical user interface (GUI), as exemplarily shown in FIG. 18, may be implemented at one or more UEs 1810, core network 1820, and 3rd party SCSs/ASs 1830. The interface may be used to trigger certain actions described in this document and view status related to service and session continuity. At the UE 1810, the GUI may be used to perform actions including but not limited to (i) signal loss of session continuity; (ii) signal loss of service continuity; (iii) display statistics about service continuity (e.g., average, maximum, etc.); (iv) display the current UE contact information of the UE; and (v) display the current status of PDU sessions for the UE (number of sessions, data network, number of application flows).

At the SCS/AS 1830, the GUI may be used to: (i) view the current status of the server (load, location); (ii) enter the location of the server (if not equipped with GPS); (iii) edit the list of suitable alternate servers; (iv) configure the parameters to be used for alternate server selection, e.g., ask the core network for UE location and mobility information; and (v) manually trigger a change of alternate server.

Within the core network, the GUI may be implemented as a network function that has access to the other network functions. The GUI may be used to: (i) query and display the PDU sessions associated with a UE; (ii) display the current load and location of the CNTPs; and (iii) display statistics about SSC mode for a specific UE, including duration of service interruptions, when a UE has multiple PDU sessions to a data network.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, transit device or the like, perform and/or implement the systems, methods and processes described herein. Specifically, any of the steps, operations or functions described above may be implemented in the form of such computer executable instructions. Computer readable storage media includes volatile and nonvolatile, removable and non-removable media implemented in any method or technology for storage of information, but such computer readable storage media do not includes signals. Computer readable storage media may include, but is not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 14-17. The computer executable instructions may be stored in a memory and executed by a processor disclosed above in FIGS. 13C and 13D, and employed in devices including UEs and SCS/ASs. Moreover, a graphical user interface as shown in FIG. 18 may be employed to interact with the plural call flows in FIGS. 14-17.

In one embodiment, a computer-implemented UE having a non-transitory memory and processor operably coupled thereto, as described above in FIGS. 1C and 1D, is disclosed. Specifically, the non-transitory memory has instructions stored thereon for managing a server transition associated with user equipment. The processor is operably coupled to the non-transitory memory and is configured to perform the instructions of: (i) receiving, at a core network, a request including credentials from a first server to switch responsibility to another server for communicating with the user equipment; (ii) verifying the credentials of the first server; tracking characteristics of the user equipment; (iii) checking the characteristics of the user equipment against the received request from the first server; and (iv) sending the response to the first server.

According to another embodiment, the non-transitory memory has instructions stored thereon for managing a server transition associated with user equipment. A processor is operably coupled to the non-transitory memory and configured to perform the instructions of: (i) receiving a relocation request from a first server to switch to another server; (ii) verifying credentials of the first server; (iii) determining whether a first core networking terminating point associated with the first server is appropriate for the other server to communicate with the user equipment; and (iv) sending a result of the determination to the user equipment.

According to another embodiment, the non-transitory memory has instructions stored thereon for managing a server transition associated with user equipment. A processor is operably coupled to the non-transitory memory and configured to perform the instructions of: (i) determining contact information of a first core network terminating point of the user equipment should be updated; (ii) requesting the user equipment to initiate a protocol data unit session with a second core network terminating point; (iii) receiving a list of servers each communicating an application flow with the user equipment; (iv) notifying a server in the list of updated contact information of the user equipment including the second core network terminating point; and (v) receiving confirmation from the server of the updated contact information.

According to yet another embodiment, the non-transitory memory has instructions stored thereon for managing a server transition associated with user equipment. A processor is operably coupled to the non-transitory memory and configured to perform the instructions of: (i) determining contact information of a first core network terminating point of the user equipment should be updated; (ii) requesting the user equipment to initiate a protocol data unit session with a second core network terminating point; (iii) determining mobile terminated traffic from a server is associated with the user equipment; (iv) sending a request to the server to update contact information of the user equipment including the second core network terminating point; and (v) receiving a notification from the server that the contact information of the user equipment has been updated.

According to yet even another embodiment, the non-transitory memory has instructions stored thereon for managing a server transition associated with user equipment. A processor is operably coupled to the non-transitory memory and configured to perform the instructions of: (i) determining that contact information of a first core network terminating point of user equipment should be updated; (ii) requesting the user equipment to initiate a protocol data unit session with a second core network terminating point; (iii) receiving a communication from a server including identification information of the user equipment; (iv) confirming the server is associated with the user equipment; (v) sending updated contact information of the user equipment including the second core network terminating point to the sever; and (vi) receiving a notification from the server that the contact information of the user equipment has been updated.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. An apparatus comprising:
    a non-transitory memory having instructions stored thereon for managing a server transition associated with a service for a user equipment (UE); and
    a processor, operably coupled to the non-transitory memory, configured to perform the instructions of:
        receiving, at a core network, a first request from a first server to switch responsibility of the service to a second server to communicate with the UE;
        determining a first core network terminating point needs updating to a second core network terminating point;
        selecting the second core network terminating point;
        sending, to the service, a notification the user equipment is associated with the second core network terminating point; and
        transmitting, to the UE, a second message notifying the UE that characteristics of a session have changed.

2. The apparatus of claim 1, where the second message is a session management message including new UE contact information.

3. The apparatus of claim 1, where the first request includes contact information of the second server.

4. The apparatus of claim 1, where the notification includes new contact information of the UE.

5. The apparatus of claim 1, the instructions further comprising receiving a request from the first server for information of the UE, and sending a response with the information of the UE.

6. The apparatus of claim 5, wherein the information of the UE include one or more of a UE Location, a UE Sleep State and a CNTP location.

7. The apparatus of claim 1, where the server is associated with an application function responsible for communicating with the core network on behalf of the server.

8. The apparatus of claim 1, where the server or application function may communicate with the core network via a network exposure function.

9. The apparatus of claim 1, where the core network terminating point is equivalent to a PDU session anchor point or user plane function in reference to 5G core network (5GCN).

10. The apparatus of claim 1, wherein the request includes one or more of application flow information, list of potential alternate servers, location of potential alternate servers, and whether the application flow information allows a change to its core network terminating point.

11. The apparatus of claim 1, wherein the determining instructions are based upon information of plural application flows through the first core network terminating point, and information of one or more servers communicating with the UE.

12. The apparatus of claim 1, wherein the sending instructions include notifying other impacted services of the UE independent of the first server.

13. The apparatus of claim 12, wherein one or more of the servers are queried for application flow information associated with the UE.

14. The apparatus of claim 1, wherein the processor is further configured to execute the instructions of requesting the UE to initiate a new protocol data unit session (PDU) and transfer a list of application flows to the second core network terminating point.

15. The apparatus of claim 14, wherein the processor is further configured to execute the instructions of coordinating a transfer of context information of the UE from the first core network terminating point to the second core network terminating point.

16. The apparatus of claim 1, wherein the non-transitory memory and processor operate as a policy control function in the core network.

17. A method, comprising:
- receiving, at a core network, a first request from a first server to switch responsibility of a service to a second server to communicate with a user equipment (UE);
- determining a first core network terminating point requires updating to a second core network terminating point;
- selecting the second core network terminating point;
- sending, to the service, a notification the UE is associated with the second core network terminating point; and
- transmitting, to the UE, a second message notifying the UE characteristics of a session have changed.

18. The method of claim 17, where the second message is a session management message including new UE contact information.

19. The method of claim 17, where the first request includes contact information of the second server.

20. The method of claim 17, where the notification includes new contact information of the UE.

* * * * *